United States Patent
Matus et al.

(10) Patent No.: US 10,347,907 B2
(45) Date of Patent: Jul. 9, 2019

(54) VOLUME CHANGE COMPENSATED SILICON-SILICON OXIDE-LITHIUM COMPOSITE MATERIAL HAVING NANO SILICON PARTICLES EMBEDDED IN A SILICON:SILICON LITHIUM SILICATE COMPOSITE MATRIX, AND CYCLICAL EX-SITU MANUFACTURING PROCESSES

(71) Applicant: EoCell Limited, Central, Hong Kong (CN)

(72) Inventors: Yuriy Matus, Pleasanton, CA (US); Yongbong Han, San Francisco, CA (US); Michael Pak, Belmont, CA (US)

(73) Assignee: EoCell Limited, Hong Kong (HK)

( * ) Notice: Subject to any disclaimer, the term of this patent is extended or adjusted under 35 U.S.C. 154(b) by 30 days.

(21) Appl. No.: 15/691,780

(22) Filed: Aug. 31, 2017

(65) Prior Publication Data

US 2018/0069233 A1    Mar. 8, 2018

Related U.S. Application Data

(60) Provisional application No. 62/383,372, filed on Sep. 2, 2016, provisional application No. 62/478,535, filed on Mar. 29, 2017.

(51) Int. Cl.

| | |
|---|---|
| *H01M 4/04* | (2006.01) |
| *H01M 4/36* | (2006.01) |
| *H01M 4/485* | (2010.01) |
| *H01M 4/38* | (2006.01) |
| *H01M 10/0525* | (2010.01) |
| *H01M 4/02* | (2006.01) |
| *H01M 4/139* | (2010.01) |

(52) U.S. Cl.
CPC ............. *H01M 4/362* (2013.01); *H01M 4/04* (2013.01); *H01M 4/386* (2013.01); *H01M 4/485* (2013.01); *H01M 4/139* (2013.01); *H01M 10/0525* (2013.01); *H01M 2004/027* (2013.01)

(58) Field of Classification Search
CPC ...... A61F 2/2421; A61F 2/2436; A61F 2/246; A61F 2/2403; A61F 2/2457; A61F 2/2487; A61F 2220/0016; A61F 2210/0014; A61F 2/2466; A61F 2230/0086; A61F 2230/0069; A61L 27/06; A61L 27/14; A61L 27/50; A61L 2430/20; A61L 2400/16; H01M 4/405; H01M 4/386; H01M 10/0525; H01M 2004/027
USPC ...... 252/521.3, 500, 506, 504, 519.1, 518.1; 428/403, 404; 427/126.1, 126.2, 126.3, 427/122
See application file for complete search history.

(56) References Cited

U.S. PATENT DOCUMENTS

| | | | |
|---|---|---|---|
| 9,735,425 B2 * | 8/2017 | Matus | H01M 4/0402 |
| 2017/0170477 A1 * | 6/2017 | Sakshaug | H01M 4/0416 |
| 2018/0241079 A1 * | 8/2018 | Duong | H01M 10/0525 |

* cited by examiner

*Primary Examiner* — Douglas J McGinty
(74) *Attorney, Agent, or Firm* — Horizon IP PTE Ltd.

(57) ABSTRACT

A method for producing a volume change compensated (SSLC) material is disclosed. An initially prelithiated SSLC material is produced and delithiated to produce a delithiated SSLC material. Perform at least one iteration involving: (a) re-prelithiating the delithiated SSLC material to produce a re-prelithiated SSLC material; and (b) delithiating the re-prelithiated SSLC material produced in (a). At least one of the following is satisfied: (i) prior to performing the at least one iteration the initially prelithiated SSLC material is essentially completely lithiated; and (ii) at least one iteration produces a re-prelithiated SSLC material that is essentially completely prelithiated. In a final iteration, delithiating the re-prelithiated SSLC material produced in (a) completely delithiates the re-prelithiated SSLC material to produce the volume change compensated SSLC material. The aforesaid process is performed ex situ with respect to fabrication of an anode that contains the produced volume change compensated SSLC material.

11 Claims, 6 Drawing Sheets

VOLUME CHANGE COMPENSATED SILICON-SILICON OXIDE-LITHIUM COMPOSITE MATERIAL HAVING NANO SILICON PARTICLES EMBEDDED IN A SILICON:SILICON LITHIUM SILICATE COMPOSITE MATRIX, AND CYCLICAL EX-SITU MANUFACTURING PROCESSES

CROSS-REFERENCE TO RELATED APPLICATIONS

This application claims the priority of U.S. Provisional Application No. 62/383,372, entitled "Silicon-Silicon Oxide-Lithium Composite Material Having Nano Silicon Particles Embedded In A Silicon-Silicon Lithium Silicate Composite Matrix, And Related Manufacturing Processes" filed on Sep. 2, 2016 and U.S. Provisional Application No. 62/478,535, entitled "Silicon-Silicon Oxide-Lithium Composite Material Having Nano Silicon Particles Embedded In A Silicon: Silicon Silicate Composite Matrix, And Related Manufacturing Processes" filed on Mar. 29, 2017.

TECHNICAL FIELD

Aspects of the present disclosure relate to a silicon-silicon oxide-lithium composite (SSLC) based material having nano silicon particles embedded in a silicon:lithium silicate composite (Si:LSC) matrix, a process for preparing the same, and manufacturing processes relating thereto, including cyclical ex situ manufacturing processes. The SSLC based material is useful as a negative electrode active material (where a negative electrode conventionally corresponds to a negative terminal of a battery or battery cell during battery discharge) for non-aqueous electrolyte battery cells, such as lithium ion battery cells.

BACKGROUND

The rapid development and market growth of mobile devices and electric vehicles has resulted in a strong demand for low cost, small size, lightweight, high energy density secondary batteries, such as lithium ion batteries. In the development of high energy density secondary batteries, cathode material technology is a well-recognized bottleneck due to the fact that cathode materials exhibit a lower capacity than anode materials. For example, improvements in cathode materials has been incremental while the capacity of cathode materials has been improved by many folds. In particular, improvements in the cathode materials have been facilitated by moving from conventional graphite to non-carbon based anode materials. Consequently, there have been extensive development efforts to produce high capacity anode materials, because a higher capacity anode can significantly increase the energy density of a commercial secondary battery, for instance, by up to 25%, when the battery is fabricated using a given type of commercially available cathode material technology.

Silicon (Si) has been investigated as an anode material for lithium ion (Li$^+$) batteries because it exhibits a high theoretical specific capacity or capacity (e.g., specific capacity of up to 3750-4200 mAh/g) as a battery cell anode material, and is an abundant, inexpensive element that is readily available as a result of its widespread use in the semiconductor industry. The electrochemical lithiation and delithiation of silicon can be generally represented as:

$$xLi^+ + Si + xe^- \longleftrightarrow Li_xSi \quad (1)$$

With respect to the use of silicon as an anode material, this high theoretical capacity results in a significant theoretical increase in the energy density and specific energy of the cell compared to graphite anode materials.

Pure silicon anodes show excellent cyclic performance when a nano thin Si film is coated on conducting graphite/carbon, or when nano sized Si is composited with nano featured metal current collectors. Silicon nano wire and silicon nano particles also show good cyclic performance depending on the properties of various polymeric binders used therewith. However, these nano structured silicon anodes work well only at very low loading density. To increase the energy density of the battery cell, the loading density of the anode increases. This means the anode is impregnated with a higher ratio of active material weight to inactive components in lithium ion cells. However, as the loading density increases, the electrodes collapse after initial cycles and the cyclic performance deteriorates.

Unfortunately, silicon anodes also exhibit a large first-cycle capacity loss, side reactions during cycling, and a very large volume change during battery cell charge—discharge or lithiation—delithiation cycles (e.g., up to 300-400%). With respect to this volume change, during lithium ion battery cycling, the Si anode is lithiated by intercalation (i.e., reversible insertion) of 4.4 Li atoms per Si atom. The very large volume change leads to mechanical failure and capacity fading. Moreover, for an as-fabricated battery having a silicon anode, the battery packaging structure or container must be sufficiently large to accommodate the maximum volumetric expansion exhibited by the silicon anode material therein, which results in larger than desired battery packaging structures or containers relative to a target or realizable battery capacity.

Silicon oxide ($SiO_x$) has also been investigated for use as an anode material for lithium ion batteries, particularly because this material shows much less volume change after the first cycle compared to pure silicon anode materials. $SiO_x$ is regarded as a uniform mixture of nano sized Si and $SiO_2$ phases that form upon energetic treatment of original $SiO_x$ material, as described by K. Schulmeister and W. Mader in "TEM investigation on the structure of amporphous silicon monoxide," *Journal of Non-Crystalline Solids* 320 (2003), pp. 143-150. When the molar ratio of Si to $SiO_2$ is 1, its volumetric ratio is 0.5. This indicates that nano silicon particles are embedded in a matrix of $SiO_2$ in the $SiO_x$ material structure.

The electrical conductivity of $SiO_x$ is low, and as $SiO_x$ is lithiated its electrical conductivity decreases. This poor electrical conductivity contributes to decreases in utilization of $SiO_x$ during cycling. The electrical conductivity of $SiO_x$ can be improved by mechanically milling $SiO_x$ (0.8<x<1.5) with graphite using high energy mechanical milling, as described in U.S. Pat. No. 6,638,662( U.S. Pat. No. 6,638, 662); or coating $SiO_x$ particles with a uniform carbon layer using thermal Chemical Vapor Deposition (CVD), as described in Japanese patent publication JP-A 2002-042806. These techniques successfully increase charge-discharge capacity, but fail to provide sufficient cyclic performance, and thus do not meet the market requirements for high energy density batteries. Therefore, such techniques have not been successfully utilized to produce commercial products in the market, as further improvement in cycle performance is imperative.

Another problematic electrochemical property of $SiO_x$ based anodes is a high irreversible capacity loss on the first charge/discharge cycle below a practical level, as described in U.S. Pat. No. 5,395,811(U.S. Pat. No. 5,395,811). As indicated in U.S. Pat. Nos. 7,776,473(7,776,472), the irreversible capacity loss of $SiO_x$ anode material can be reduced by way of prelithiating the $SiO_x$ material (i.e., prior to manufacturing an anode from an $SiO_x$ based anode material, introducing lithium into a source $SiO_x$ material that has not been previously lithiated in order to produce a lithium-loaded $SiO_x$ based anode material from which an anode can be fabricated).

U.S. Pat. No. 7,776,473 and U.S. Pat. No. 8,231,810(U.S. Pat. No. 8,231,810), respectively, indicate the following reactions between lithium and SiO:

$$4Li+4SiO \rightarrow Li_4SiO_4+3Si \quad (2)$$

The chemical reaction mainly forms lithium silicate ($Li_4SiO_4$) and silicon. In view of the aforementioned mixture of nano sized Si and matrix $SiO_2$ within $SiO_x$, the reaction between lithium and $SiO_2$ matrix can be expressed as follows:

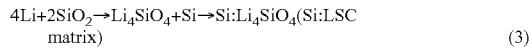
$$4Li+2SiO_2 \rightarrow Li_4SiO_4+Si \rightarrow Si:Li_4SiO_4(Si:LSC\ matrix) \quad (3)$$

Depending on reaction conditions, some research groups have indicated that lithium silicate consists of $Li_4SiO_4$, $Li_2O$, and $Li_2SiO_3$. The major component is $Li_4SiO_4$. The irreversible chemical reaction of Li and the $SiO_2$ matrix in the $SiO_x$ structure also forms the matrix of lithium silicate and lithium silicide ($Li_ySi$) mixture.

$SiO_x$ based anodes generally show much better cyclic performance compared to pure Si based anodes after the first cycle, under the condition that both are micro-sized. Additionally, during lithiation—delithiation cycles, $SiO_x$ based anode materials exhibit much less volumetric change compared to silicon anode materials. More particularly, during the first lithiation of SiO, when the $SiO_2$ phase matrix irreversibly changes into the mixture of $Li_4SiO_4$ and $Li_ySi$, the volume increases by a factor of two. During delithiation, $Li_4SiO_4$ remains as the same, and $Li_ySi$ becomes silicon. As a result, Si:LSC ($Si:Li_4SiO_4$) matrix becomes porous, and because of plastic deformation of $Li_4SiO_4$ matrix, the volume change from $Li_ySi:Li_4SiO_4$ to $Si:Li_4SiO_4$ can be minimized. Consequently, the volume change of $SiO_x$ based anode particles is much smaller than that of pure silicon anode particles after the first cycle. Notwithstanding, in as-fabricated lithium ion batteries having $SiO_x$ based anodes, it would be desirable to further minimize anode volumetric change (e.g., by further reducing volumetric expansion) resulting from lithiation—delithiation or battery cell charge—discharge cycles.

U.S. Pat. No. 7,776,473 teaches the prelithiation of $SiO_x$ by milling $SiO_x$ powder with active lithium powder through a high energy ball milling process. This prelithiation successfully reduces the irreversible capacity loss from 35% to 15%. However, U.S. Pat. No. 7,776,473 also indicates that as a result of this prelithiation process, the reversible capacity was only 800 to 900 mAh/g which is much smaller than most $SiO_x$ anodes coated with graphite with a reversible capacity of 1400 to 1700 mAh/g. Unfortunately, the results obtained by the process of U.S. Pat. No. 7,776,473 are not sufficient for satisfying the characteristics required for a commercial anode material. Lower irreversible capacity loss of the first cycle and improved cyclic performance are still required.

Further to the foregoing, while anode material prelithiation can reduce irreversible capacity loss, prelithiated anode materials have an undesirably high chemical reactivity due to the presence of highly reactive, chemically unstable lithium therein. This high chemical reactivity can lead to difficulties in handling and processing prelithiated anode materials during conventional battery manufacturing processes, or render the prelithiated anode materials incompatible with conventional battery manufacturing processes. For instance, prelithiated anode materials may be incompatible with solvents, binders, thermal processing conditions, and/or ambient environments commonly encountered in battery manufacturing processes. A need also exists to overcome this problem.

SUMMARY

In accordance with an aspect of the present disclosure, a process for producing a volume change compensated silicon-silicon oxide-lithium composite (SSLC) material includes: producing an initially prelithiated SSLC material; delithiating the initially prelithiated material to produce a delithiated SSLC material; and performing at least one iteration of a volume change compensation process that includes: (a) re-prelithiating the delithiated SSLC material to produce a re-prelithiated SSLC material; and (b) delithiating the re-prelithiated SSLC material produced in (a), wherein at least one of the following is satisfied: (i) prior to performing the at least one iteration of the volume change compensation process the initially prelithiated SSLC material is essentially completely lithiated; and (ii) at least one iteration of the volume change compensation process produces a re-prelithiated SSLC material that is essentially completely prelithiated, wherein in a final iteration of the volume change compensation process, delithiating the re-prelithiated SSLC material produced in (a) comprises completely delithiating the re-prelithiated SSLC material to produce the volume change compensated SSLC material, and wherein the volume change compensated SSLC material is produced prior to, or ex situ with respect to, the fabrication of an anode that contains the produced volume change compensated SSLC material.

In various embodiments, the volume change compensated SSLC material includes or is a porous plastically deformable Si:lithium silicate composite (Si:LSC) matrix having nano silicon particles embedded therein. The initially prelithiated SSLC material and the re-prelithiated material produced during each iteration of the volume change compensation process can be produced in slurry form.

In multiple embodiments, the volume change compensation process is repeated 3-12 times, but can be repeated fewer than 3 or more than 12 times in certain embodiments.

In some embodiments, in each iteration of the volume change compensation process, the re-prelithiated SSLC material is essentially completely prelithiated.

In some embodiments, in a selected iteration of the volume change compensation process the re-prelithiated SSLC material has a higher lithium content than in another iteration of the volume change compensation process.

In multiple embodiments, each delithiated re-prelithiated SSLC material essentially completely delithiates the re-prelithiated SSLC material.

In various embodiments, delithiating the initially prelithiated SSLC material and delithiating the re-prelithiated SSLC material includes exposing the initially prelithiated SSLC material and exposing the re-prelithiated SSLC material, respectively, to a delithiating agent comprising at least one of a carboxylic acid, a sulfonic acid, and an alcohol.

For instance, in a number of embodiments, the delithiating agent can include at least one of: formic acid (methanoic acid), HCOOH ($pK_a$=3.8); acetic acid (ethanoic acid), $CH_3COOH$ ($pK_a$=4.7); propionic acid (propanoic acid), $CH_3CH_2COOH$ ($pK_a$=4.9); butyric acid (butanoic acid), $CH_3CH_2CH_2COOH$ ($pK_a$=4.8); valeric acid (pentanoic acid), $CH_3CH_2CH_2CH_2COOH$ ($pK_a$=4.8); caproic acid (hexanoic acid), $CH_3CH_2CH_2CH_2CH_2COOH$ ($pK_a$=4.9); oxalic acid (ethanedioic acid), (COOH)(COOH) ($pK_a$=1.2); lactic acid (2-hydroxypropanoic acid), $CH_3CHOHCOOH$ ($pK_a$=3.9); malic acid (2-hydroxybutanedioic acid), (COOH)$CH_2$CHOH(COOH) ($pK_a$=3.4); citric acid (2-hydroxypropane-1,2,3-tricarboxylic acid), $CH_2$(COOH)COH(COOH)$CH_2$(COOH) ($pK_a$=3.1); benzoic acid (Benzenecarboxylic acid [IUPAC] or phenylmethanoic acid, non-IUPAC), $C_6H_5COOH$ ($pK_a$=4.2); carbonic acid (hydroxymethanoic acid, non-IUPAC name), OHCOOH or $H_2CO_3$ ($pK_a$=3.6); phenol (carbolic acid or hydroxybenzene, non-IUPAC names), $C_6H_5OH$ ($pK_a$=9.9); uric acid (7,9-Dihydro-1H-purine-2,6,8(3H)-trione), $C_5H_4N_4O_3$ ($pK_a$=−1.1); taurine (2-aminoethanesulfonic acid), $C_2H_7NO_3S$ ($pK_a$=9.0); p-toluenesulfonic acid (4-methylbenzenesulfonic acid), $CH_3C_6H_4SO_3H$ ($pK_a$=−2.8); and trifluoromethanesulfonic acid, $CF_3SO_3H$ ($pK_a$=−12).

In a number of embodiments, the delithiating agent can include at least one of: (a) a monohydric alcohol selected from among: methanol, $CH_3OH$; ethanol, $C_2H_5OH$; propan-2-ol, $C_3H_7OH$; butan-1-ol, $C_4H_9OH$; pentan-1-ol, $C_5H_{11}OH$; and hexadecan-1-ol, $C_{16}H_{33}OH$; (b) a polyhydric alcohol selected from among: ethane-1,2-diol, $C_2H_4(OH)_2$; propane-1,2-diol, $C_3H_6(OH)_2$; propane-1,2,3-triol, $C_3H_5(OH)_3$; butane-1,2,3,4-tetraol, $C_4H_6(OH)_4$; pentane-1,2,3,4,5-penotol, $C_5H_7(OH)_5$; hexane-1,2,3,4,5,6-hexol, $C_6H_8(OH)_6$; and heptane-1,2,3,4,5,6,7-heptol, $C_7H_9(OH)_7$; (c) an unsaturated aliphatic alcohol selected from among prop-2-ene-1-ol, $C_3H_5OH$; 3,7-dimethylocta-2,6-dien-1-ol, $C_{10}H_{17}OH$; and prop-2-yn-1-ol, $C_3H_3OH$; (d) an alicyclic alcohol selected from among: cyclohexane-1,2,3,4,5,6-hexol, $C_6H_6(OH)_6$; and 2-(2-propyl)-5-methyl-cyclohexane-1-ol, $C_{10}H_{19}OH$; and (e) polyvinyl alcohol (PVA) $[CH_2CH(OH)]_n$.

In accordance with a further aspect of the present disclosure, a process for fabricating an anode or anode structure for a lithium ion battery includes: producing a volume change compensated silicon: silicon oxide: lithium composite (SSLC) material by: producing an initially prelithiated SSLC material; delithiating the initially prelithiated material to produce a delithiated SSLC material; and performing at least one iteration of a volume change compensation process including: (a) re-lithiating the delithiated SSLC material to produce a re-prelithiated SSLC material; and (b) delithiating the re-prelithiated SSLC material produced in (a), wherein at least one of the following is satisfied: (i) prior to performing the at least one iteration of the volume change compensation process the initially prelithiated SSLC material is essentially completely lithiated; and (ii) at least one iteration of the volume change compensation process produces a re-prelithiated SSLC material that is essentially completely prelithiated, wherein in a final iteration of the volume change compensation process, delithiating the re-prelithiated SSLC material produced in (a) comprises completely delithiating the re-prelithiated SSLC material to produce the volume change compensated SSLC material; and after producing the volume change compensated SSLC material, fabricating an anode structure containing the produced volume change compensated SSLC material.

DISCLOSURE

In the present disclosure, depiction of a given element or consideration or use of a particular element number in a particular FIG. or a reference thereto in corresponding descriptive material can encompass the same, an equivalent, or an analogous element or element number identified in another FIG. or descriptive material associated therewith. The use of "/" in a FIG. or associated text is understood to mean "and/or" unless otherwise indicated. The recitation of a particular numerical value or value range herein is understood to include or be a recitation of an approximate numerical value or value range, for instance, to within +/−10%, +/−5%, +/−2.5%, or +/−1% of a particular numerical value or value range under consideration.

Further Aspects of the Technical Problem

As indicated above, high capacity silicon oxide based anodes offer excellent cyclic performance at higher loading density compared to pure silicon based anodes, but silicon oxide based anodes suffer from low initial efficiency. Although irreversible capacity loss can be reduced in the manner disclosed by U.S. Pat. No. 7,776,473, the inventors of the present application have found that prelithiation of $SiO_x$ in accordance with the teachings of U.S. Pat. No. 7,776,473 (i.e., introducing lithium into the $SiO_x$ prior to its use in the fabrication of an anode or as an anode material), which is performed by ball milling solid state materials (i.e., solid silicon oxide powder and metallic lithium powder), results in incomplete and non-uniform lithiation. That is, complete, uniform prelithiation of $SiO_x$ by ball milling solid state materials in the manner disclosed by U.S. Pat. No. 7,776,473 is difficult to achieve.

U.S. Pat. No. 7,776,473 discloses that the rate of diffusion of metallic lithium into solid $SiO_x$ is low, making it difficult for metallic lithium to uniformly penetrate into the $SiO_x$. Furthermore, the use of larger amounts of metallic lithium powder during ball milling to potentially provide a greater concentration of lithium available for diffusion into $SiO_x$ is not feasible in view of safety concerns due to the highly reactive nature of lithium, as well as the need to remove decomposed products during the ball milling process. U.S. Pat. No. 7,776,473 teaches the use of a small, controlled amount of lithium powder, such that the amount of lithium added provides an atomic ratio of lithium to oxygen less than or equal to 2 (i.e., Li/O≤2). U.S. Pat. No. 7,776,473 further teaches that after the reaction of $SiO_x$ with metallic lithium through ball milling, an organolithium compound (e.g., alkyllithium or aryllithium) can be added to compensate for or complement a lithium shortage. Notwithstanding, even with such addition of an organolithium compound (butyllithium), the prelithiation process taught by U.S. Pat. No. 7,776,473 results in a low reversible capacity of 800-900 mAh/g, in contrast to conventional carbon coated SiOx anodes that exhibit a reversible capacity of 1400-1700 mAh/g.

The prelithiation process disclosed in U.S. Pat. No. 7,776,473 cannot avoid the formation of lithium silicide. The low reversible capacity of 800-900 mAh/g obtained by the process of U.S. Pat. No. 7,776,473 indicates that after this process is performed, the lithium in lithium silicide may be oxidized at the surface of the particles produced when the particles are exposed to air, and thus reducing conductivity. Additionally, lithium silicide will cause the gellation of an electrode slurry mixture by reacting with polymer binders or N-methyl-pyrolidone (NMP).

As also indicated above, prelithiated anode materials have an undesirably high chemical reactivity due to the lithium contained therein, which can lead to handling difficulties or incompatibility issues when prelithiated anode materials are used in conventional battery manufacturing processes.

In addition to the foregoing, U.S. Pat. No. 7,776,473 does not consider any manner of further reducing or minimizing the volumetric expansion that an SiOx based anode experiences in an as-fabricated battery as a result of battery charge—discharge cycling.

Technical Solution and Summary

Embodiments in accordance with the present disclosure are directed to a fully delithiated silicon-silicon oxide-lithium composite (SSLC) particulate material or SSLC based particulate material having amorphous and/or crystalline nano silicon particles embedded in a porous matrix of one or more materials, including a porous plastically deformable silicon:lithium silicate composite (Si:LSC) matrix. In various embodiments, this SSLC/SSLC based material has an average particle size of approximately 1 to 10 μm; the Si:LSC matrix has silicon particle or grain sizes of 10-200 nm; and the nano silicon particles embedded therein have particle or grain sizes of approximately 0.5-150 nm (e.g., 0.5-80 nm, or 0.5-50 nm).

Embodiments in accordance with the present disclosure are correspondingly directed to a process for producing or manufacturing such an SSLC/SSLC based material, where the process includes a prelithiation—delithiation sequence performed using a source material such as an $SiO_x$ material and/or an intermediate or produced SSLC/SSLC based material, prior to the fabrication of an anode using the SSLC/SSLC based material. Thus, with respect to an as-fabricated anode or battery cell made from the SSLC/SSLC based material, the prelithiation—delithiation sequence is performed ex situ, before anode fabrication using the SSLC/SSLC based material, and thus the prelithiation—delithiation sequence is separate from or not as part of an in situ battery cell lithiation—delithiation cycle or battery cell discharge—charge cycle performed on the anode that has been fabricated using the SSLC/SSLC based material. Furthermore, in accordance with embodiments of the present disclosure, in association with the production of a given SSLC/SSLC based material under consideration, the prefix "pre" in the terms "prelithiation" or "prelithiated" as used herein corresponds to, indicates, or implies an ex situ environment or situation that is established or which exists prior to the use of the SSLC/SSLC based material under consideration as a non-aqueous electrolyte secondary cell negative electrode (anode) material, for instance, prior to the fabrication of an anode or battery cell that incorporates the produced SSLC/SSLC based material under consideration, and which is therefore an environment or situation that is established or which exists prior to an in situ environment or situation in which an anode or battery cell has already been formed using the produced SSLC/SSLC based material. An individual having ordinary skill in the relevant art will recognize in view of their fundamental knowledge of the art and the description herein that a prelithiated SSLC/SSLC based material is a particular SSLC/SSLC based material that contains at least some lithium therein, but which is not completely or fully delithiated, and which prior to its complete or full delithiation is not recommended or intended for use as a source material from which an anode or battery cell should directly be fabricated.

In various embodiments, an ex situ prelithiation—delithiation sequence includes at least one process portion (e.g., a first process portion, or a first prelithiation process portion) involving complete or essentially complete and uniform prelithiation of $SiO_x$ and the production of the SSLC/SSLC based material having lithium silicide uniformly distributed therein; followed by a counterpart process portion (e.g., a second process portion, or a final delithiation process portion) involving complete delithiation of the SSLC/SSLC based material.

Several embodiments in accordance with the present disclosure are directed to cyclical ex situ prelithiation—delithiation of an SSLC/SSLC based material, by which a volume change compensated or volume change stabilized SSLC/SSLC based material is produced. In such embodiments, the cyclical ex situ prelithiation—delithiation sequence includes multiple prelithiation process portions involving at least partial prelithiation of $SiO_x$ and/or an at least partially delithiated SSLC/SSLC based material, where at least one of the prelithiation process portions involves complete or essentially complete prelithiation of $SiO_x$ and/or a delithiated SSLC/SSLC based material; and a counterpart delithiation process portion corresponding to each prelithiation process portion, involving delithiation of the SSLC/SSLC based material, where at least a final delithiation process portion involves complete delithiation of the SSLC/SSLC based material.

In accordance with such embodiments directed to cyclical ex situ prelithiation—delithiation sequence, an $SiO_x$ and/or an SSLC/SSLC based source material (a) is subjected to at least partial prelithiation one or more times thereby producing an at least partially prelithiated SSLC/SSLC based material, and is also subjected to complete or essentially complete prelithiation at least one time thereby producing a completely or essentially completely prelithiated SSLC/SSLC based material; and (b) for each such prelithiation (whether partial or complete/essentially complete) to which the SSLC/SSLC based material has been subjected, the SSLC/SSLC based material is further subjected to delithiation, including at least one final complete delithiation.

As a result of being subjected to ex situ prelithiation and delithiation multiple times (e.g., by way of multiple counterpart prelithiation—delithiation cycles), including at least one complete prelithiation and at least one complete delithiation, completely or fully delithiated volume change compensated or volume change stabilized SSLC/SSLC based material produced in accordance with particular embodiments of the present disclosure will exhibit further reduced, minimal, or minimum volumetric expansion during in situ lithiation in a battery cell, for instance, in a manner generally related, similar, or analogous to that described in "In-situ Measurement of Electrode Thickness Change during Charge and Discharge of a Large Capacity SiO Anode," Takuhiro Miyuki et al., *Electrochemistry* (Electrochemical Society of Japan), 80.405, p.p 405-408; and "Nano-porous SiO/Carbon Composite Material for Lithium-Ion Batteries," Wei-Ren Liu et al., Journal of Applied Electrochemistry, Vol. 39, Issue 9, pp. 1643-1649.

Completely or fully delithiated SSLC/SSLC based material produced in accordance with embodiments of the present disclosure (e.g., an SSLC/SSLC based material produced by way of multiple ex situ prelithiation—delithiation cycles in accordance with an embodiment of the present disclosure) is suitable for use in battery manufacturing processes (e.g., conventional battery manufacturing processes) as a result of lacking lithium therein. Embodiments in accordance with the present disclosure are further directed to use of a delithiated SSLC/SSLC based material in the production or manufacture of a battery cell or battery; and also to a battery cell anode made with the delithiated SSLC/SSLC based material.

Such an SSLC/SSLC based material when used as negative electrode active material for non-aqueous electrolyte battery cells, such as lithium ion battery cells, has many advantages. The porous matrix of material(s) in which the SSLC or SSLC based material resides, including the porous already plastically deformable Si:LSC matrix, greatly reduces or minimizes any volume changes associated with lithiation/delithiation of the SSLC/SSLC based material during the battery cell charge and discharge process. When used as negative electrode active material in a lithium ion battery cell, an SSLC/SSLC based material in accordance with an embodiment of the present disclosure can exhibit a volume change of less than or equal to approximately 7-35% (e.g., averaging less than or equal to approximately 15-35%, or less than or equal to approximately 10-20%) between lithiation (discharging) and delithiation (charging). This compares very favorably to earlier use of Si in $SiO_2$ as anode where during lithiation anode undergoes an unacceptably large volumetric change, e.g., of up to 200%.

In view of the foregoing, when essentially fully or fully prelithiated SSLC/SSLC based material is produced in accordance with an embodiment of the present disclosure, such prelithiated SSLC/SSLC based material will exhibit or occupy a maximized, essentially maximum, or maximum volume (or correspondingly, a maximum extent of volumetric expansion), in ex situ form. When this essentially fully or fully prelithated SSLC/SSLC based material is then essentially fully or fully delithiated (which occurs prior to its use in a lithium ion battery, battery cell, or anode manufacturing process), it will exhibit or occupy a minimized, essentially minimum, or minimum volume (or correspondingly, a maximum extent of volumetric contraction).

When such essentially fully or fully delithiated SSLC/SSLC based material is subsequently used in situ in a battery cell as an anode active material in association with battery cell (re)charging and discharging by way of anode active material lithiation and delithiation, respectively, the volume change of the SSLC/SSLC based anode active material will approximately range or transition between the aforementioned volumetric extremes, e.g., the maximum volume of the prelithated SSLC/SSLC based material and the minimum volume of the delithiated SSLC/SSLC based material. Moreover, the magnitude of the volumetric change between such volumetric extremes, i.e., the difference between the maximum volume of the SSLC/SSLC based material when fully lithiated in situ corresponding to a fully charged battery cell state, and the minimum volume of the SSLC/SSLC based material when fully delithiated in situ corresponding to a fully discharged battery cell state, is predictable and remains stable, generally stable, or changes only minimally over time, from an initial battery cell charge—discharge state transition through successive battery cell (re)charge—discharge state transitions, changes, or cycles across time.

Because the maximum extent of volumetric change, transition, shift, or swing of the SSLC/SSLC based active anode material in a lithium ion battery cell is limited to less than or equal to 10-35% rather than a much or dramatically larger volumetric change, such as 200%, this means that either (a) for a given, target, or predetermined size anode, the use of the SSLC/SSLC based material in battery cell manufacturing can result in a battery cell having a significantly or much greater energy density/capacity; or (b) a significantly or much smaller amount of SSLC/SSLC based material can be used in a battery cell manufacturing process to produce an anode having a given energy density/capacity, resulting in a much smaller or thinner anode and hence a significantly or much smaller or thinner battery cell with higher energy density/capacity. For instance, an SSLC/SSLC based material in accordance with an embodiment of the present disclosure can exhibit an energy density that is approximately 300% greater than that of a conventional graphite material. Therefore, the use of an SSLC/SSLC based material as an anode active material in a lithium ion battery cell means that (i) for a battery cell anode of a given, target, or predetermined size, the battery cell can increase about 25-30% in volumetric energy density; or (ii) for a battery cell of a given, target, or predetermined capacity, the size of the battery cell anode can be roughly or approximately ⅓ that of a battery cell anode that uses conventional graphite material as its active anode material.

Further to the foregoing, individuals having ordinary skill in the relevant art will recognize that the extent or range of the battery cell's overall volumetric change as a result of (re)charging and discharging will be less than the extent of volumetric change of the battery cell's anode. More particularly, the overall extent of the battery cell's volumetric change depends upon the thickness of the battery cell's anode relative to the thickness of the battery cell's cathode; and the anode is commonly or typically significantly or much thinner than the cathode (e.g., the anode may only be approximately ⅓ as thick as the cathode). Moreover, cathode active materials commonly exhibit a smaller or much smaller change in volume in association with battery cell (re)charging and discharging. Consequently, the overall extent of volume change or volumetric expansion and contraction of a battery cell that uses as its active anode material an SSLC/SSLC based material in accordance with an embodiment of the present disclosure can be approximately 3-10% (e.g., approximately 5%-8%).

Additionally, a lithium ion battery cell that includes an SSLC/SSLC based anode material in accordance with an embodiment of the present disclosure can exhibit an irreversible capacity loss of less than 15% (e.g., less than 12%, or less than 10%, or within a range of approximately 8%-12%), which is a significant reduction in irreversible capacity loss compared to the prior art, and which meets commercial requirements. Moreover, such a lithium ion battery cell can exhibit a reversible capacity of greater than approximately 1100 mAh/g (e.g., 1200 mAh/g or higher).

Lastly, to facilitate its use in an anode manufacturing process, the SSLC/SSLC based material obtained by way of an ex situ process in accordance with an embodiment of the present disclosure is delithiated during the ex situ process, and thus prior to its use as a source material for an anode manufacturing process the obtained SSLC/SSLC based material will not contain active lithium therein, and hence does not give rise to battery manufacturing process related handling or incompatibility issues. In other words, for a final SSLC/SSLC based material obtained by way of an ex situ production process in accordance with the present disclosure, the final SSLC/SSLC based material would have been delithiated during the ex situ production process. Consequently, the lithium from the active lithium silicide would have been removed from the final material obtained by way of the ex situ SSLC/SSLC based material production process, prior to the use of the final SSLC/SSLC based material as a source material in an anode manufacturing process.

In the disclosure herein, an SSLC based material can be defined as an SSLC material in which $SiO_x$ has been conductivity-enhanced prior to or in association with prelithiation. For instance, an SSLC based material can be a silicon-silicon oxide-lithium-carbon or silicon-silicon oxide-lithium-carbon based composite (SSLCC) material, in which the electrical conductivity of $SiO_x$ has been enhanced by way of treating or combining the $SiO_x$ with a carbon based material such as graphite and/or one or more types of carbon or carbon based nanoparticles/nanostructures prior to or in association with prelithiation, as further detailed below. For purpose of brevity and simplicity, in the description that follows, the term "SSLC material" encompasses or includes an SSLC based material such as an SSLCC material.

In accordance with an aspect of the present disclosure, a process for producing a silicon-silicon oxide-lithium composite (SSLC) material includes performing a prelithiation process and a delithiation process. The prelithiation process results in the production of a prelithiated material, and includes producing a partially prelithiated SSLC material by way of a mechanical mixing procedure comprising milling silicon oxide powder and lithium powder; and producing a further prelithiated SSLC material by way of a spontaneous lithiation procedure including: compressing the partially prelithiated SSLC material matrix material; and exposing the compressed partially prelithiated SSLC material to a lithium based electrolyte, wherein spontaneous lithiation procedure completes reaction of unreacted lithium and $SiO_x$ in the partially prelithiated SSLC material, until unreacted lithium disappears and a uniform composition of lithium silicides is achieved in the SSLC material by lithium diffusion. The delithiation process follows the prelithiation process and results in the production of a delithiated SSLC material. The delithiation process includes dispersing the compressed further prelithiated SSLC material in a liquid carrier medium to thereby produce a dispersed prelithiated SSLC material; and exposing the dispersed prelithiated SSLC material to a volume of one or more chemical substances or compounds (e.g., one or more organic acids and/or alcohols) that can react with lithium silicide within the dispersed prelithiated SSLC material and extract lithium from the dispersed prelithiated SSLC material, until reactivity of lithium silicide within the dispersed prelithiated SSLC material with the one or more chemical substances or compounds ceases or has effectively reached a final level, wherein the volume of the one or more chemical substances or compounds acts as a reservoir with respect to reacting with lithium silicide within the dispersed prelithiated SSLC material, wherein the delithiated SSLC material comprises a porous plastically deformable Si:lithium silicate composite (Si:LSC) matrix having nano silicon particles embedded therein. For purpose of brevity and clarity, in the disclosure that follows a chemical substance or compound that can react with lithium silicide within the dispersed prelithiated SSLC material and extract lithium therefrom is referred to as a delithiating agent.

The delithiated SSLC material can have a lithium silicide content of less than 0.5% by weight. The delithiated SSLC material can have a particle size of 1 to 10 μm, the Si:LSC matrix can exhibit a grain size of 10-200 nm, and the nano silicon particles can have a particle size of 5-150 nm (e.g., 5-80 nm, or 5-50 nm). In various embodiments, the delithiated SSLC material has a silicon content of 30%-60% by weight, an oxygen content of 25%-40% by weight, and a lithium content of 10%-20% by weight. The delithiated SSLC material can have a composition of approximately 37% silicon by weight, approximately 18% lithium by weight, and approximately 43% oxygen by weight.

The liquid carrier medium includes an aprotic solvent, for instance, hexane. It does not react with lithium silicide but help to disperse the lithiated SSLC powder so that it the delithiation rate can be controlled. Especially, Alkane compounds such as CnHn+2, where n is generally larger than 3 are more desirable than other aprotic solvents.

The one or more delithiating agents can include or be an acid and/or an alcohol, such as an organic acid (e.g., a carboxylic acid, a sulfonic acid, or another type of acid) and/or a short, medium, or long chain alcohol (e.g., where a short chain alcohol can be defined as an alcohol that has an alkyl chain of 1-3 carbons, a medium chain alcohol can be defined as an alcohol that has an alkyl chain of 4-7 carbons, and a long chain alcohol can be defined as an alcohol that has an alkyl chain of more than 7 carbons). The delithiating agent(s) are selected to provide controlled or controllable reactivity with lithium in order to reduce or minimize reaction volatility, while adequately driving the delithiation reaction. Non-limiting representative delithiating agents include the following:

Non-Exhaustive List of Representative Acids Suitable as Delithiating Agents

Formic acid (methanoic acid), HCOOH ($pK_a$=3.8); acetic acid (ethanoic acid), $CH_3COOH$ ($pK_a$=4.7); propionic acid (propanoic acid), $CH_3CH_2COOH$ ($pK_a$=4.9); butyric acid (butanoic acid), $CH_3CH_2CH_2COOH$ ($pK_a$=4.8); valeric acid (pentanoic acid), $CH_3CH_2CH_2CH_2COOH$ ($pK_a$=4.8); caproic acid (hexanoic acid), $CH_3CH_2CH_2CH_2CH_2COOH$ ($pK_a$=4.9); oxalic acid (ethanedioic acid), (COOH)(COOH) ($pK_a$=1.2); lactic acid (2-hydroxypropanoic acid), $CH_3CHOHCOOH$ ($pK_a$=3.9); malic acid (2-hydroxybutanedioic acid), $(COOH)CH_2CHOH(COOH)$ ($pK_a$=3.4); citric acid (2-hydroxypropane-1,2,3-tricarboxylic acid), $CH_2(COOH)COH(COOH)CH_2(COOH)$ ($pK_a$=3.1); benzoic acid (benzenecarboxylic acid [IUPAC] or phenylmethanoic acid, non-IUPAC), $C_6H_5COOH$ ($pK_a$=4.2); carbonic acid (hydroxymethanoic acid, non-IUPAC name), OHCOOH or $H_2CO_3$ ($pK_a$=3.6); phenol (carbolic acid or hydroxybenzene, non-IUPAC names), $C_6H_5OH$ ($pK_a$=9.9); uric acid (7,9-Dihydro-1H-purine-2,6,8(3H)-trione), $C_5H_4N_4O_3$ ($pK_a$=−1.1); taurine (2-aminoethanesulfonic acid), $C_2H_7NO_3S$ ($pK_a$=9.0); p-toluenesulfonic acid (4-methylbenzenesulfonic acid), $CH_3C_6H_4SO_3H$ ($pK_a$=−2.8); and trifluoromethanesulfonic acid (also known as triflic acid), $CF_3SO_3H$ ($pk_a$=−12).

Non-Exhaustive List of Representative Alcohols Suitable as Delithiating Agents (a) monohydric alcohols: methanol, $CH_3OH$; ethanol, $C_2H_5OH$; propan-2-ol, $C_3H_7OH$; butan-1-ol, $C_4H_9OH$; pentan-1-ol, $C_5H_{11}OH$; and hexadecan-1-ol, $C_{16}H_{33}OH$.

(b) polyhydric alcohols: ethane-1,2-diol, $C_2H_4(OH)_2$; propane-1,2-diol, $C_3H_6(OH)_2$; propane-1,2,3-triol, $C_3H_5(OH)_3$; butane-1,2,3,4-tetraol, $C_4H_6(OH)_4$; pentane-1,2,3,4,5-penotol, $C_5H_7(OH)_5$; hexane-1,2,3,4,5,6-hexol, $C_6H_8(OH)_6$; and heptane-1,2,3,4,5,6,7-heptol, $C_7H_9(OH)_7$.

(c) unsaturated aliphatic alcohols: Prop-2-ene-1-ol, $C_3H_5OH$; 3,7-dimethylocta-2,6-dien-1-ol, $C_{10}H_{17}OH$; and prop-2-yn-1-ol, $C_3H_3OH$.

(d) alicyclic alcohols: cyclohexane-1,2,3,4,5,6-hexol, $C_6H_6(OH)_6$; and 2-(2-propyl)-5-methyl-cyclohexane-1-ol, $C_{10}H_{19}OH$.

(e) polymer alcohols: polyvinyl alcohol (PVA) $[CH_2CH(OH)]_n$.

The silicon oxide powder can be characterized as $SiO_x$ (0.8<x<1.6), and the mechanical mixing procedure can include ball milling the silicon oxide powder with the lithium powder, and the lithium powder can include or be SLMP®.

The process can include performing a first electrical conductivity enhancement process prior to the prelithiation process, wherein the first electrical conductivity enhancement process comprises least one of ball milling the silicon oxide powder with an electrically conductive material such as a carbon based material, and/or coating the silicon oxide powder with an electrically conductive material such as a carbon based material. Additionally or alternatively, the process can include performing a second electrical conductivity enhancement process after the delithiation process, wherein the second electrical conductivity enhancement process comprises at least one of ball milling the silicon oxide powder with an electrically conductive material such as a carbon based material, and/or coating the silicon oxide powder with an electrically conductive material such as a carbon based material. Depending upon embodiment details, a carbon based material can include at least one of graphite, carbon black, buckyballs, carbon nanotubes, carbon megatubes, and carbon nanobuds.

In accordance with an aspect of the present disclosure, a delithiated SSLC material is produced by the process set forth above and has a lithium silicide content of less than 0.5% by weight.

In accordance with an aspect of the present disclosure, a delithiated SSLC material that is produced by the process set forth above and which has a lithium silicide content of less than 0.5% by weight is used in a battery cell negative electrode manufacturing process.

In accordance with an aspect of the present disclosure, a lithium ion battery cell has as its negative electrode active material an SSLC material, and exhibits an irreversible capacity loss of less than 15% (e.g., less than 12%, or less than 10%). The SSLC active material can be produced by the process set forth above. An anode of the lithium ion battery cell can exhibit a volume change of 10-35% (e.g., an average volume change of 15-25%, or an average volume change of 20%) in association with lithium ion battery cell charging and discharging.

Particular Advantageous Effects

An SSLC material production process in accordance with an embodiment of the present disclosure provides a simple, robust, commercially scalable, cost effective process by which an SSLC material useful and useable as a negative electrode material that satisfies market requirements can be produced. An SSLC material obtained by way of an SSLC material production process in accordance with an embodiment of the present disclosure can be used as a negative electrode material to produce a lithium ion battery anode that exhibits uniformity or improved uniformity, and greatly reduces or minimizes, volume change as a result of lithiation and delithiation, and which has an irreversible capacity loss that is significantly or greatly reduced or minimized compared to prior $SiO_x$ based anodes. To facilitate its use in battery cell or battery manufacturing processes, the SSLC material is completely delithiated prior to its use in a battery cell or battery manufacturing process, and thus the SSLC material is compatible with solvents, binders, thermal processing conditions, and/or ambient environments associated with typical battery manufacturing processes. In addition, an electrode slurry containing an SSLC material produced in accordance with an embodiment of the present disclosure forms a good laminated electrode structure without forming a deleterious gel, even when a relatively large amount of lithium has been used to prelithiate $SiO_x$ particles.

DETAILED DESCRIPTION

In view of the foregoing, in some embodiments an ex situ prelithiation—delithiation sequence involves a single prelithiation process that results in the production of a completely or essentially completely prelithiated SSLC/SSLC based material, and a single corresponding or counterpart delithiation process that results in the production of a completely or essentially completely delithiated SSLC/SSLC based material. In other embodiments, a cyclical ex situ prelithiation—delithiation sequence involves multiple prelithiation processes and multiple counterpart delithiation processes, including at least one complete prelithiation process and a final complete delithiation process.

For purpose of simplicity and to aid understanding, aspects of representative embodiments in accordance with the present disclosure that include a single complete/full prelithiation process followed by a single counterpart complete/full delithiation process are elaborated upon in the detailed description that immediately follows, after which aspects of representative embodiments of cyclical ex situ prelithiation—delithiation sequences are described.

Aspects of Representative SSLC Material Production Processes

Figure 1:
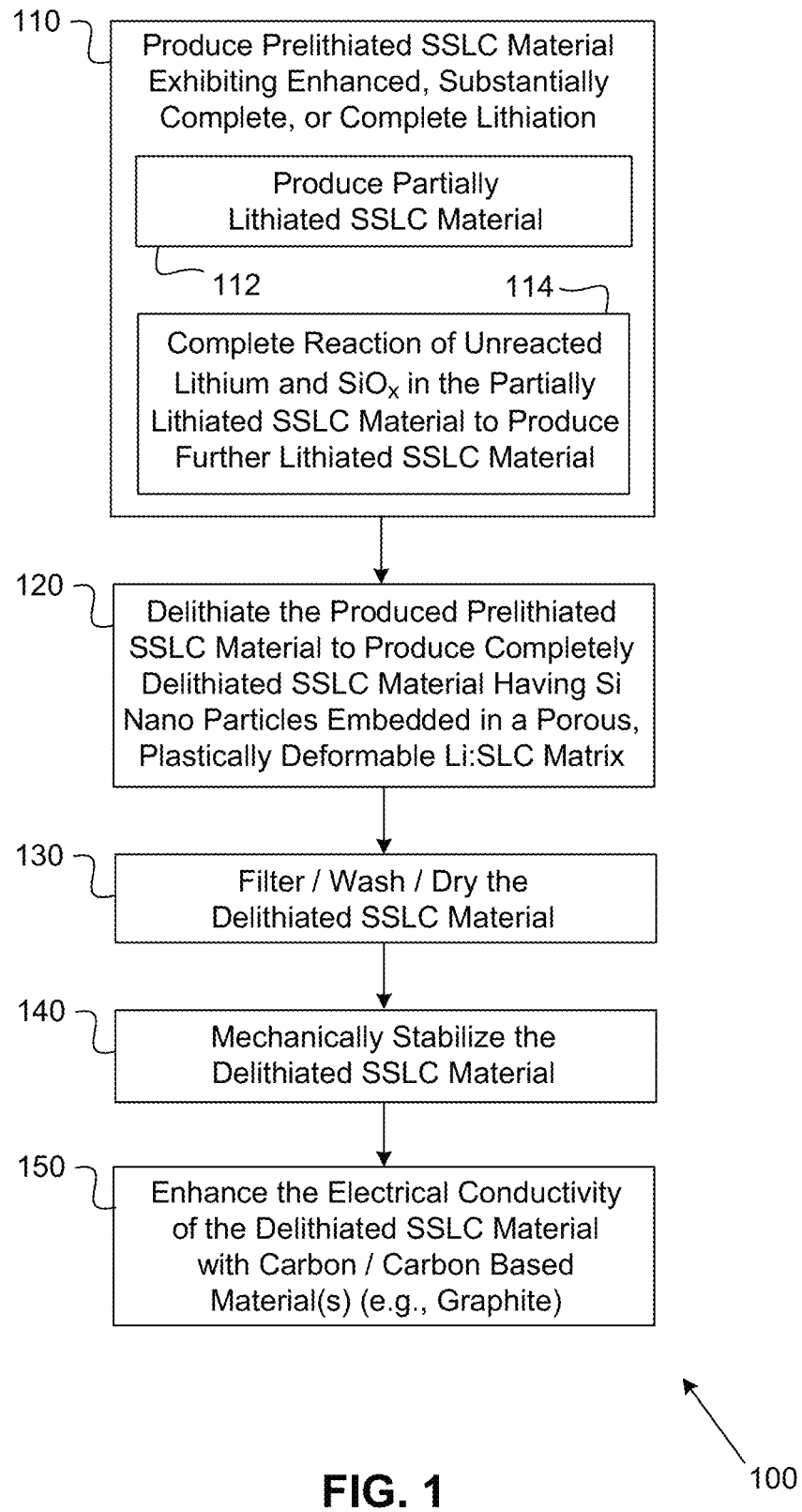
FIG. 1 is a flow diagram of a representative process for producing or manufacturing a silicon-silicon oxide-lithium composite (SSLC) material structure, or composition in accordance with an embodiment of the present disclosure.

Aspects of a Representative Non-Cyclical ex situ Prelithiation—Delithiation Sequence FIG. 1 is a flow diagram of a representative process 100 for producing or manufacturing an SSLC material, material structure, or composition by way of a non-cyclical ex situ prelithiation—delithiation sequence in accordance with an embodiment of the present disclosure. In various representative embodiments, such an SSLC material production process 100 includes a first process portion 110 by which prelithiated SSLC material is produced; a second process portion 120 by which this prelithiated SSLC material is delithiated; a third process portion 130 by which the delithiated SSLC material is filtered, washed, and dried; possibly a fourth process portion 140 by which the delithiated SSLC material is coated with one or more materials for purpose of enhancing mechanical or structural integrity or stability; and typically a fifth process portion 150 by which the delithated SSLC material or the mechanically stabilized SSLC material is coated or combined with carbon or a carbon based material to enhance electrical conductivity. Aspects of the SSLC material production process 100 are described in detail hereafter.

The first process portion 110 produces the prelithiated SSLC material by way of a first or initial prelithiation procedure 112, followed by a second or subsequent prelithiation procedure 114. The first prelithiation procedure 112 produces a partially prelithiated SSLC material, after which the second prelithiation procedure 114 produces an SSLC material that exhibits a significantly enhanced, substantially complete, or complete extent of prelithiation compared to the prior art. More particularly, in the first prelithiation procedure, $SiO_x$ and/or conductivity-enhanced $SiO_x$ in powder form can be mixed, combined, and/or reacted with metallic lithium, such as stabilized lithium powder (e.g., SLMP® from FMC Corporation, Charlotte, N.C. USA, www.fmclithium.com), to produce the partially prelithiated SSLC material in powder form. The first or initial prelithiation procedure 112 can be similar, generally analogous, analogous, substantially identical, essentially identical, or identical to that disclosed in U.S. Pat. No. 7,776,473, which is incorporated herein by reference. Conductivity-enhanced $SiO_x$ can be produced for use in or as part of the first prelithiation procedure 112 by way of treating, coating, or combining $SiO_x$ with one or more electrically conductive materials, for instance, carbon or carbon based materials such as graphite, carbon black, graphene, buckyballs, carbon nanotubes, carbon megatubes, carbon nanorings, and/or carbon nanobuds in a conventional manner, as will be readily understood by individuals having ordinary skill in the relevant art. In some embodiments, conductivity-enhanced $SiO_x$ is produced by ball milling $SiO_x$ with one or more carbon or carbon based materials, which can result in carbon or carbon based particles entering or becoming part of agglomerated $SiO_x$ particles produced during ball milling. Such ball milling can occur by way of a procedure that is similar, generally analogous, analogous, substantially identical, essentially identical, or identical to the ball milling of $SiO_x$ powder with graphite as described in U.S. Pat. No. 6,638,662, which is also incorporated herein by reference. Additionally or alternatively, conductivity-enhanced $SiO_x$ can be produced for use in the first prelithiation procedure 112 by way of another technique, such as thermal CVD by which an electrically conductive material such as carbon or a carbon based material is deposited on the $SiO_x$ powder prior to its reaction with the lithium powder.

Reacting $SiO_x$ and/or conductivity-enhanced $SiO_x$ powder with stabilized lithium powder can be carried out using a temperature controlled mixing/reaction device that applies a high shear stress in an inert gas atmosphere (e.g., an argon atmosphere, or an atmosphere containing helium), and which provides effective dissipation of heat generated during the reaction. Such a reaction device can be a ball mill, for instance, a planetary ball mill such as that described in U.S. Pat. No. 7,776,473, having a thermally regulated or thermally conductive reaction container, vessel, or jar in which $SiO_x$ and/or conductivity-enhanced $SiO_x$ powder with stabilized lithium powder are mixed. Mixing/reaction device related parameters that can influence or determine the characteristics of the partially lithiated SSLC material include the heat release, heat transfer, and shear stress during the reaction, and the characteristics of the partially prelithiated SSLC material can vary with charge, rotational speed, and/or milling time, in a manner readily understood by individuals having ordinary skill in the art.

When electrical conductivity-enhanced $SiO_x$ is used in the first process portion 110, the electrical conductivity enhancement can result in the $SiO_x$ having a significantly improved thermal conductivity (e.g., when the electrical conductivity-enhanced $SiO_x$ includes or is $SiO_x$ reacted or coated with graphite), which can aid heat dissipation and thermal regulation during ball milling, as further detailed below.

The first process portion 110 further includes subjecting the partially prelithiated SSLC material to the second prelithiation procedure 114, in which the partially prelithiated SSLC material is compressed (e.g., compressed into pellets or pelletized in a conventional manner, such as by way of conventional pelletizing equipment (i.e., a pelletizer) or press, or direct compression tableting equipment) and immersed in a lithium based electrolyte solution (e.g., a lithium salt based electrolyte solution, or an equivalent thereto) in order to complete the reaction of unreacted lithium and $SiO_x$ in the partially prelithiated SSLC material, until all unreacted lithium disappears and an enhanced uniformity or uniform composition of lithium silicides is achieved in the SSLC material by lithium diffusion. Additionally or alternatively, the partially prelithiated SSLC material can be immersed in another type of chemical solution, for instance, an ester, a carbonate, or a solvent used in Li ion battery electrolyte solvent, in a manner understood by individuals having ordinary skill in the relevant art.

The second prelithiation procedure 114 produces or gives rise to a more fully prelithiated SSLC material than the first prelithiation procedure 112. That is, as a result of the second prelithiation procedure, the extent of lithiation in the partially prelithiated SSLC material obtained by way of the first prelithiation procedure 112 is enhanced, significantly enhanced, or greatly enhanced, thereby producing an essentially completely/fully, or completely/fully prelithiated SSLC material. As a result of the second prelithiation procedure 114, the SSLC material exhibits much more uniform or uniform prelithiation, for instance, over a shorter or significantly or greatly reduced time period (e.g., as compared to ball milling alone), as well as an extent of prelithiation that is greater, significantly greater, or much greater than the extent of prelithiation achieved by the teachings of U.S. Pat. No. 7,776,473. In multiple embodiments, the first process portion 110 (i.e., the first prelithiation procedure 112 in combination with the second prelithiation procedure 114) results in a substantially complete, essentially complete, or complete prelithiation of the SSLC material, which includes lithium silicide uniformly or generally uniformly distributed therein.

Thus, the second prelithiation procedure 114 further and possibly completely prelithiates the SSLC material in a uniform or highly uniform manner, which enables the SSLC material to achieve maximum volumetric plastic deformation such that most of the free Si nanoparticles in the SSLC form lithium silicide. If the second prelithiation procedure 114 is not carried out, there is a chance that the SSLC material may expand further or greatly when the delithiathed SSLC material is charged during actual use as anode active material, which will cause unwanted volumetric expansion. Additionally, if the SSLC material is more fully or completely prelithiated by way of the second prelithiation procedure 114, the energy density and capacity of the SSLC material can be enhanced or maximized/optimized such that the Si nano particles in the amorphous subsequently delithiated SSLC material have greater capacity to receive lithium ions without excessive increase in the SSLC material's volume. In various embodiments, after the first process portion 110 (i.e., upon completion of the first and second prelithiation procedures 112, 114), the extent of prelithiation of the SSLC material can range from approximately 25%-75%, or approximately 25%-100%.

Following the first process portion 110 (i.e., after the first and second prelithiation procedures 112, 114 have been performed), in various embodiments the SSLC material production process 100 further includes a second process portion 120 that involves delithiating the prelithiated SSLC material in a delithiation reactor in the presence of at least one delithiating agent, to thereby produce a delithiated SSLC material in which amorphous and/or crystallite silicon nanoparticles are embedded in an Si:LSC matrix, and any unreacted lithium and active lithium silicide do not remain in this matrix. The second process portion 120 involves dispersing the prelithiated SSLC material in an organic solvent or an organic solvent mixture, and controllably reacting the dispersed lithiated SSLC material with the delithiating agent(s) such as an acid and/or an alcohol that reacts with lithium silicide in a controllable manner such that the prelithiated SSLC material loses lithium, thereby becoming essentially completely or completely (fully) delithiated SSLC material.

The delithiating agent(s) can include or be an acid and/or an alcohol, such as an organic acid and/or a short, medium, or long chain alcohol. The delithiating agent(s) and delithiation reaction temperature range(s) or temperature(s) are selected to provide drive the delithiation reaction in a controlled or controllable reactivity with lithium, while managing, reducing, or minimizing reaction volatility. In various embodiments, a suitable delithiating agent can include or be a carboxylic acid or a sulfonic acid, or an organic alcohol. Non-limiting representative delithiating agents suitable for use in particular embodiments of the present disclosure include the following:

Non-Exhaustive List of Representative Acids Suitable for Use as Delithiating Agents Formic acid (methanoic acid), HCOOH ($pK_a$=3.8); Acetic acid (ethanoic acid), $CH_3COOH$ ($pK_a$=4.7); Propionic acid (propanoic acid), $CH_3CH_2COOH$ ($pK_a$=4.9); Butyric acid (butanoic acid), $CH_3CH_2CH_2COOH$ ($pK_a$=4.8); Valeric acid (pentanoic acid), $CH_3CH_2CH_2CH_2COOH$ ($pK_a$=4.8); Caproic acid (hexanoic acid), $CH_3CH_2CH_2CH_2CH_2COOH$ ($pK_a$=4.9); Oxalic acid (ethanedioic acid), (COOH)(COOH) ($pK_a$=1.2); Lactic acid (2-hydroxypropanoic acid), $CH_3CHOHCOOH$ ($pK_a$=3.9); Malic acid (2-hydroxybutanedioic acid), (COOH)$CH_2$CHOH(COOH) ($pK_a$=3.4); Citric acid (2-hydroxypropane-1,2,3-tricarboxylic acid), $CH_2$(COOH)COH(COOH)$CH_2$(COOH) ($pK_a$=3.1); Benzoic acid (Benzenecarboxylic acid [IUPAC] or phenylmethanoic acid, non-IUPAC), $C_6H_5COOH$ ($pK_a$=4.2); Carbonic acid (hydroxymethanoic acid, non-IUPAC name), OHCOOH or $H_2CO_3$ ($pK_a$=3.6); Phenol (carbolic acid or hydroxybenzene, non-IUPAC names), $C_6H_5OH$ ($pK_a$=9.9); Uric acid (7,9-Dihydro-1H-purine-2,6,8(3H)-trione), $C_5H_4N_4O_3$ ($pK_a$=−1.1); Taurine (2-aminoethanesulfonic acid), $C_2H_7NO_3S$ ($pK_a$=9.0); p-Toluenesulfonic acid (4-methylbenzenesulfonic acid), $CH_3C_6H_4SO_3H$ ($pK_a$=−2.8); and Trifluoromethanesulfonic acid (also known as triflic acid), $CF_3SO_3H$ ($pk_a$=−12).

Non-Exhaustive List of Representative Alcohols Suitable for Use as Delithiating Agents (a) monohydric alcohols: Methanol, $CH_3OH$; ethanol, $C_2H_5OH$; propan-2-ol, $C_3H_7OH$; butan-1-ol, $C_4H_9OH$; pentan-1-ol, $C_5H_{11}OH$; and hexadecan-1-ol, $C_{16}H_{33}OH$.

(b) polyhydric alcohols: ethane-1,2-diol, $C_2H_4(OH)_2$; propane-1,2-diol, $C_3H_6(OH)_2$; propane-1,2,3-triol, $C_3H_5(OH)_3$; butane-1,2,3,4-tetraol, $C_4H_6(OH)_4$; pentane-1,2,3,4,5-penotol, $C_5H_7(OH)_5$; hexane-1,2,3,4,5,6-hexol, $C_6H_8(OH)_6$; and heptane-1,2,3,4,5,6,7-heptol, $C_7H_9(OH)_7$.

(c) unsaturated aliphatic alcohols: Prop-2-ene-1-ol, $C_3H_5OH$; 3,7-dimethylocta-2,6-dien-1-ol, $C_{10}H_{17}OH$; and prop-2-yn-1-ol, $C_3H_3OH$.

(d) alicyclic alcohols: cyclohexane-1,2,3,4,5,6-hexol, $C_6H_6(OH)_6$; and 2-(2-propyl)-5-methyl-cyclohexane-1-ol, $C_{10}H_{19}OH$.

(e) polymer alcohols: polyvinyl alcohol (PVA) $[CH_2CH(OH)]_n$.

After the second process portion 120, the delithiated SSLC material can have a lithium silicide content of less than approximately 0.5% by weight. In various embodiments, the second process portion 120 occurs under an inert environmental atmosphere (e.g., argon and/or nitrogen gas), and involves stirring to facilitate delithiation, in a manner readily understood by individuals having ordinary skill in the relevant art.

Figure 2:
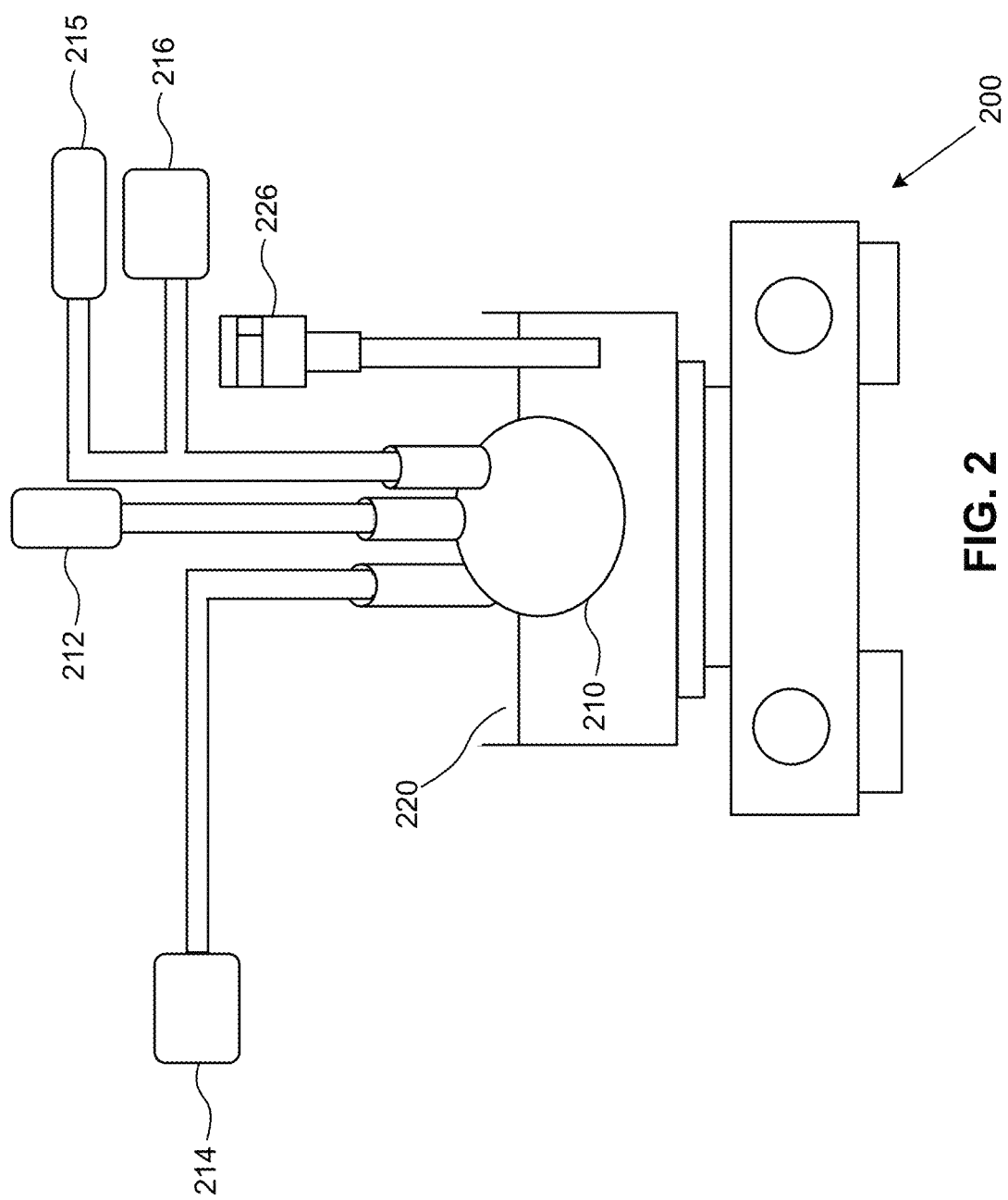
FIG. 2 is a schematic illustration of a representative delithiation reactor in accordance with an embodiment of the present disclosure.

FIG. 2 is a schematic illustration of a representative delithiation reactor 200 in accordance with an embodiment of the present disclosure. In an embodiment, the delithiation reactor 200 includes a reaction vessel 210; at least one delithiating agent source or supply 212 having a conduit or feed line into the reaction vessel 210; an inert gas supply (e.g., an argon gas supply) 214 having a conduit or feed line into the reaction vessel 210; a gas exhaust 215 having a conduit or exhaust line leading from the reaction vessel 210; and a first temperature probe 216 having a temperature sensing device (e.g., a thermocouple) disposed in the reaction vessel 210. The reaction vessel 210 is disposed in a cooling bath 220, which is associated with or includes a second temperature probe 226 having a temperature sensing device (e.g., a thermocouple) disposed therein.

Figures 3A, 3B, 3C:
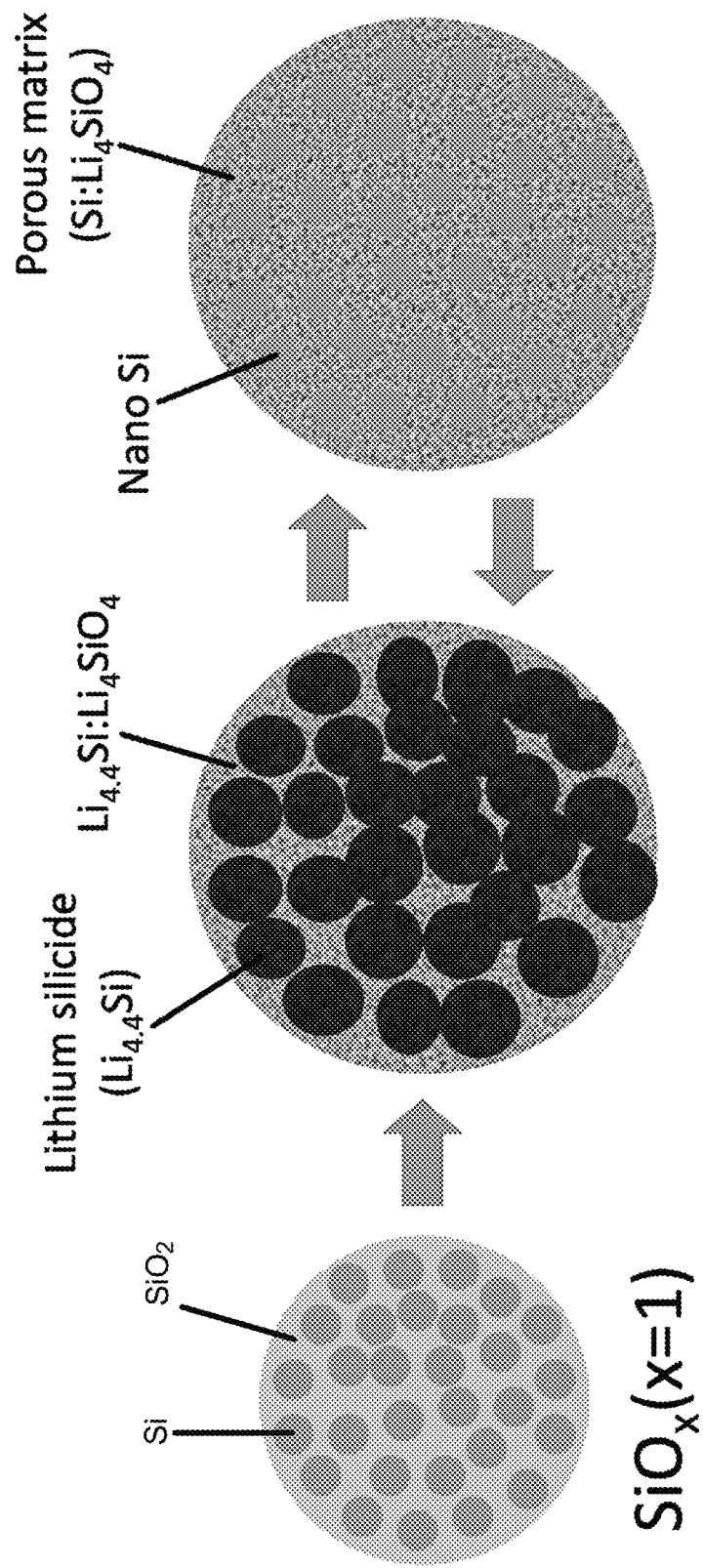
FIGS. 3A-3C are illustrations of representative microstructural characteristics of $SiO_x$ (x=1); representative microstructural characteristics of prelithiated SSLC produced in accordance with an embodiment of the present disclosure; and representative microstructural characteristics of delithiated SSLC produced in accordance with an embodiment of the present disclosure, respectively.

FIGS. 3A-3C are illustrations showing representative microstructural characteristics of $SiO_x$ (x=1); representative microstructural characteristics of prelithiated SSLC material (e.g., essentially fully or completely prelithiated SSLC material) produced in accordance with an embodiment of the present disclosure; and representative microstructural characteristics of delithiated SSLC material (e.g., essentially fully or completely delithiated SSLC material) produced in accordance with an embodiment of the present disclosure, respectively. In view of FIG. 1 and FIGS. 3A-3C, the first process portion 110 reacts $SiO_x$ powder with lithium powder to irreversibly transform or plastically deform the $SiO_x$ powder into significantly, substantially completely, or completely prelithiated SSLC material; after which the prelithiated SSLC material is completely delithiated to produce a porous, plastically deformable Si:LSC matrix that carries amorphous and/or crystalline nano silicon particles, which can subsequently be reversibly lithiated and delithiated, in a manner readily understood by individuals having ordinary skill in the art. Thus, when delithiated SSLC material produced by way of an ex situ SSLC material production process in accordance with an embodiment of the present disclosure is subsequently used in situ as a lithium ion battery anode material, these nano silicon particles carried by the Si:LSC matrix can act as lithium intercalation sites (or analogously, lithium "receptor sites" and "donor sites," respectively), during anode material lithiation and delithiation.

In the delithiated SSLC material produced in accordance with embodiments of the present disclosure, the matrix of lithium silicate that carries the silicon nano particles behaves in a manner similar or analogous to a solid electrolyte that transports lithium ions (in)to the silicon nano particles, while greatly or dramatically reducing or minimizing SSLC material volume changes. This is achieved by way of the prelithiation and delithiation processes described herein, as well as tightly controlling the uniform distribution of silicon nano particles and the porosity of the Si:LSC matrix during the anode material manufacturing process.

With reference again to FIG. 1, the third process portion 130 involves filtering, washing, and possibly drying the delithiated SSLC material in a conventional manner, for instance, drying in air and possibly drying under negative pressure or vacuum, where such drying can occur at a temperature between 100-120° C. (e.g., in an oven). In the fourth process portion 140, the delithiated SSLC material can be mechanically stabilized or structurally reinforced by way of coating with one or more types of materials, such as one or more of $LiAlO_3$, $Al_2O_3$, $TiO_2$, $AlF_3$, and LiF in a conventional manner. Finally, in the fifth process portion 150, the delithiated SSLC material or the mechanically stabilized delithiated SSLC material is treated, coated, or combined with one or more carbon and/or carbon based materials such as graphite, carbon black, graphene, buckyballs, carbon nanotubes, carbon megatubes, carbon nanorings, and/or carbon nanobuds in a conventional manner. In several embodiments, the fifth process portion 150 involves coating the delithiated SSLC material or the mechanically stabilized delithiated SSLC material with a carbon based material (e.g., graphite) by way of CVD, which partially fuses the carbon based material with the delithiated SSLC material. Individuals having ordinary skill in the art will recognize that depending upon embodiment details, the fifth process portion 150 can occur before and/or after the fourth process portion 140.

Following the fifth process portion 150, the delithiated SSLC material can be used as a non-aqueous electrolyte secondary cell negative electrode (anode) material.

Further Aspects of a Representative SSLC Material Production Process

In view of the foregoing, a particulate delithiated SSLC material in accordance with an embodiment of the present disclosure can be produced in powder form, which has a microstructure in which amorphous and/or crystalline silicon on the atomic level is dispersed as nano silicon grains in the Si:LSC matrix thereof. The size of the nano silicon grains is typically in the range of 0.5-80 nm, and the Si:LSC matrix typically exhibits a grain size of 10-200 nm. The SSLC material particles, i.e., the SSLC powder particulates, typically have an average particle size of 1 to 10 μm. In various embodiments, the delithiated SSLC material, i.e., the SSLC material having no or essentially no unreacted lithium or lithium silicide therein, has a silicon content of 30 to 60% by weight, an oxygen content of 25 to 40% by weight; and a lithium content of 10 to 20% by weight.

In multiple embodiments, the fully prelithiated SSLC material have a composition of approximately 31% silicon by weight, approximately 32% lithium by weight, and approximately 35% oxygen by weight; and the fully delithiated SSLC material can have a composition of approximately 37% silicon by weight, approximately 18% lithium by weight, and approximately 43% oxygen by weight.

The delithiated SSLC material can be prepared by reacting silicon oxide powder typically characterized as $SiO_x$ ($0.8<x<1.6$) with metallic lithium powder at controlled temperature. In the absence of electrical conductivity enhancement, the SSLC material has a low electrical conductivity. Hence, it is recommended that the $SiO_x$ and/or the surface of the delithiated SSLC material undergo treatment or reaction with one or more types of electrically conductive materials, such as carbon or carbon based materials, to enhance their electrical conductivity. Carbon coatings can be easily formed by way of thermal CVD, such as thermal CVD of graphite, which improves conductivity to a high level. Additionally or alternatively, a highly conductive surface can be obtained by premilling $SiO_x$ powder with an electronically conductive material such as graphite powder or carbon black powder. The amount of carbon present in or coated on the SSLC powder is typically 3 to 20% by weight, based on the weight of the SSLC material powder. The carbon coating layer maintains a chemical bond with the surface of the SSLC material, and can remain on the surface even after large volume expansion.

EXAMPLE 1

Silicon oxide powder ($SiO_x$, $0.8<x<1.6$, Sigma Aldrich) and/or silicon oxide based powder is milled with lithium powder in a high energy ball milling machine using hexane as a dispersing medium under a protective argon atmosphere. The silicon oxide and/or silicon oxide based powder is premixed with stabilized lithium powder SLMP® (FMC Corporation) under an inert gas (argon) atmosphere in a closed container or vial, in 5, 10, 15, and 20% by weight increments (e.g., 6 g $SiO_x$ is premixed with 3.8 g SLMP®) understood by individuals having ordinary skill in the relevant art. While metallic lithium is generally available in powder, foil or mass form, the use of stabilized lithium powder SLMP® (FMC Corporation) is typically preferable.

The silicon oxide and/or silicon oxide-based material premixed with metallic lithium is transferred into a ball milling container, vessel, or jar (e.g., a 50 ml or larger container); and then ball milled, i.e., mechanically mixed for reaction with lithium in a ball milling machine having an effective heat dissipation capability. The reaction container should be tightly sealed with rubber rings under an inert gas atmosphere designed for cooling control, and capable of mixing under high shear stresses. A planetary high energy ball milling machine is a good representative example ball milling machine for such milling process. For instance, a planetary ball milling machine produced by Retsch GmbH, containing a predetermined number of milling stainless steel or zirconium oxide balls, can be used. The mill has a tight closure, potential heat dissipation of balls, and high shear stress. In a representative embodiment, the ball milling container is rotated in forward and backward directions each for ten minutes while maintaining an internal controlled temperature (e.g., 40-150° C.).

After ball milling, the container is allowed to cool, e.g., to room temperature, after which the partially prelithiated silicon-silicon oxide-lithium composite (i.e., the partially lithiated SSLC material) is removed from the container. In order to enhance or maximize the extent and uniformity of prelithiation, this partially prelithiated SSLC material is subsequently compressed into pellets in a conventional manner, with hexane elimination by filtration or evaporation. The pellets are then placed in a vessel or container and immersed in an electrolyte or a mixture of electrolytes in order to complete the reaction of unreacted lithium with $SiO_x$ powder, to thereby produce the further, substantially completely, or completely prelithiated SSLC material, which exhibits enhanced uniformity or uniform prelithiation. The temperature is controlled to prevent violent reaction of unreacted lithium with $SiO_x$.

More particularly, in a solid state reaction between a solid siliceous material such as $SiO_x$ powder and metallic lithium, the rate of lithium diffusion into the solid siliceous material is generally low. It is difficult for metallic lithium to react uniformly with the solid $SiO_x$ powder, and as a result, various chemical compositions such as unreacted lithium, unreacted $SiO_2$, and various kinds of lithium silicide and lithium silicates can be produced. One effective approach for complementing this lithium shortage is to compress the prelithiated powder into pellets and immerse the compressed pellets in an electrolyte or a mixture of electrolytes. In order to avoid a violent reaction, the temperature is controlled to start from a temperature between 5° C. to room temperature.

The pellets of the enhanced, substantially completely, or completely and uniformly prelithiated SSLC material are subsequently ground in a mortar after filtration, and dispersed in hexane in a delithiation reactor 200, which is purged with and maintained under an inert gas atmosphere (e.g., argon gas). To this newly prepared slurry in the delithiation reactor 200, a delithiation agent, which in Example 1 is ethanol, is slowly added while the slurry is stirred (e.g., by way of an automatic stirrer provided in the delithiation reactor 200). Lithium silicide reacts with the ethanol, and the prelithiated SSLC material thereby loses lithium. Ethanol is added until bubble formation is stopped, indicating that the completely delithiated SSLC material has been produced. The completely delithiated SSLC material is subsequently filtered and washed in a conventional manner. After filtration and washing, the powder can be coated with $LiAlO_3$, $Al_2O_3$, $TiO_2$, $AlF_3$, LiF, and/or other material(s) (e.g., at a coating thickness of approximately 20-50 nm, or about 30 nm) for mechanical stabilization, and/or dried and coated with carbon (e.g., graphite) by way of CVD.

With reference again to the production of the prelithiated SSLC material, the source silicon oxide ($SiO_x$, $0.8<x<1.6$) and/or silicon oxide-based material is milled through high energy ball milling until it reaches a predetermined or desired size distribution. Consequently, it reacts with metallic lithium powder by way of the ball milling process in the inert gas atmosphere. Because the reaction is strongly exothermic, it can easily ignite and lead to a significant particle growth of Si and $SiO_2$ and loss of electrochemical activity upon disproportionation. To control the growth of the unreacted $SiO_2$ phase, the temperature of the reaction container should be controlled below 150° C.

$SiO_x(x\cong1)$ is a mixture of Si and $SiO_2$ at the nano scale. Because the volume of crystalline Si therein is 33%, $SiO_x$ has a structure in which nano crystalline Si particles are embedded in the matrix of $SiO_2$.

When $2SiO_2$ reacts with $(4+y)Li$, it forms an $Li_ySi$: $Li_4SiO_4$ composite, as follows:

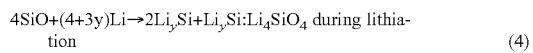

where the $Li_ySi$ is in the form of nano particles, and the $Li_ySi:Li_4SiO_4$ is in the form of a matrix that carries the $Li_ySi$ nano particles. When delithiation occurs,

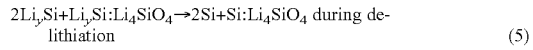

where the Si is in the form of nano particles, and the $Si:Li_4SiO_4$ is in the form of a matrix that carries the Si nano particles.

During lihtiation/de-lithiation, $Li_ySi:Li_4SiO_4$ and $Si:Li_4SiO_4$ can exist as a matrix at a certain level of lithiation (e.g., up to a limit of approximately 50%). If the reaction processes to an ignited state, the lithium silicide ($Li_ySi$) from the matrix can be agglomerated into the nano lithium silicide particles. As a result, lithium silicide particles can grow, as the matrix of $Li_ySi:Li_4SiO_4$ loses lithium silicide to the lithium silicide particles. This will cause a large volume change due to large silicon particles during lithiation and delithiation and deteriorate cyclic performance. Therefore, it is important to perform the reaction of lithium with $SiO_x$ at a temperature not exceeding 150° C.

The use of $SiO_x$ that has been pretreated or precoated with a material that enhances its thermal conductivity prior to ball milling with SLMP® can improve heat dissipation and temperature control within the ball milling container during ball milling. For instance, the $SiO_x$ can be pretreated or precoated with a carbon or carbon based material such as graphite (e.g., by way of ball milling and/or CVD, as set forth above), which concurrently increases the electrical conductivity and the thermal conductivity of the $SiO_x$. Furthermore, because of the improved heat dissipation and better temperature control, a larger amount of lithium powder can be ball milled with a given amount of such pretreated/precoated $SiO_x$ without deleterious effect of uncontrolled heating and SiO powder agglomeration. For instance, instead of 10% incremental addition of SLMP, approximately 25% incremental addition of SLMP® can occur when the $SiO_x$ is pretreated or precoated with a carbon or carbon based material such as graphite.

During lithiation of $SiO_x$ anodes, the volume increase of $Li_ySi$ phase plastically deforms the $Li_4SiO_4$ phase in the matrix of $Li_ySi:Li_4SiO_4$. Because the volume ratio of $Li_{4.4}Si$ to $Li_4SiO_4$ in the matrix is 1, the $Li_4SiO_4$ phase may not exist as a matrix when y is close to 4.4. During delithiation, $Li_ySi$ loses lithium and its volume rapidly decreases. However, the plastically deformed $Li_4SiO_4$ remains substantially or essentially unchanged or stays the same at a certain level, and becomes very porous. This can explain how the volume change before and after de-lithiation is minimized by the plastic deformation of the $Li_4SiO_4$ phase. Reaction (4) above indicates that $2Li_ySi$ nano particles are embedded in the matrix of $Li_ySi:Li_4SiO_4$. As y is close to 4.4, the volume ratio of $2Li_ySi$ to $Li_ySi:Li_4SiO_4$ is 1, and the volume increase of $2Li_ySi$ also contributes to the large plastic deformation of the $Li_ySi:Li_4SiO_4$ phase and leaves larger permanent defects in the matrix. This mechanism indicates that the volume change of lithiated $SiO_x$ anodes can be significantly reduced or minimized during lithiation/de-lithiation. As a result, a micro-sized $SiO_x$ anode generally shows much better cyclic performance than a micro-sized silicon anode when both are well coated with conducting carbon.

The plastically deformed $Li_ySi:Li_4SiO_4$ may be fragile and may collapse as a result of lithiation/delithiation cycling across many cycles. In order to enhance the mechanical property of the matrix during cycling, nano film(s) such as $LiAlO_2$, $Al_2O_3$, $TiO_2$, $AlF_3$, LiF, $SiO_2$ and/or one or more other kinds of metal oxide can coat the delithiated SSLC powder after de-lithiation of $Li_ySi$. The coating layer can fill the defects on the surface of delithiated SSLC anodes and support their mechanical stability. Moreover, the coating layer can aid the formation and possibly enhance the stability of a solid electrode interphase (SEI) layer formed at the anode—electrolyte interface in a lithium ion battery cell. Still further, the coating layer can increase the likelihood that a Li ion battery cell anode made using delithiated SSLC material in accordance with an embodiment of the present disclosure remains sufficiently electrically conductive across many charging/discharging or lithiation/delithiation cycles (or correspondingly, expansion/contraction cycles) over time.

To improve or further improve the conductivity of the delithiated SSLC material, carbon and/or carbon based material(s) can be applied to the delithiated SSLC material particles by thermal CVD, specifically by heating a CVD chamber in which the delithiated SSLC material resides to a temperature of 600 to 900° C. and feeding an organic matter gas or vapor into the CVD chamber. The conductive carbon can be insufficiently fused on the surface of the composite particles below 800° C. However, above a certain temperature, crystalline Si particles embedded in the matrix of $SiO_2$ in $SiO_x$ structure can be agglomerated with the silicon phase from the $Si:Li_4SiO_4$ matrix and then the crystalline silicon can grow. This deteriorates the cyclic performance. As a result, the CVD chamber temperature should remain in the range of 800 to 950° C.

The organic material used to coat carbon via CVD can be selected from materials capable of forming carbon (graphite) through pyrolysis at the above temperature range under an inert atmosphere. Examples of hydrocarbons that can form such carbon include but are not limited to methane, ethane, ethylene, acetylene, propane, butane, butene, pentane, isobutane, and hexane alone or in an admixture thereof; alcohols and monocyclic to tricyclic aromatic hydrocarbons such as benzene, toluene, xylene, styrene, ethylbenzene, diphenylmethane, naphthalene, phenol, cresol, nitrobenzene, chlorobenzene, indene, coumarone, pyridine, anthracene, and phenanthrene alone or in an admixture thereof., coal tar or it's by product, sucrose, starch or their derivatives Organic polymers or polymeric or oligomeric siloxanes having large hydrocarbon side chains can alternatively be used as a carbon source.

The delithiated SSLC material powder can be used as a negative electrode material in order to construct a non-aqueous electrolyte secondary cell, especially a lithium ion secondary cell, having a high capacity, good cycle performance and low irreversible capacity from the first cycle. The positive electrode active material can be selected from commercially available cathodes such as $LiCoO_2$, lithium nickel cobalt manganese oxide (NCM), lithium rich NCM, lithium nickel cobalt oxide doped with aluminum, and spinel lithium manganese oxide. The electrolytes used herein can be lithium salts such as one or more of lithium perchlorate, $LiPF_6$, $LiBF_6$, and LITFSI (Lithium Bis(Trifluoromethanesulfonyl)Imide) in non-aqueous solution form. Examples of the non-aqueous solvents include propylene carbonate, ethylene carbonate, dimethoxyethane, .gamma.-butyrolactone and 2-methyltetrahydrofuran, alone or in an admixture.

EXAMPLE 2

A second Example is described hereafter, which is performed in a manner analogous or substantially identical to that described above for Example 1, in a manner readily understood by individuals having ordinary skill in the relevant art in view of the description herein.

$SiO_x$ powder ($SiO_x$, $0.8<x<1.6$, Sigma Aldrich) is ball milled for up to 5 hours in an ethanol solvent. After SiOx particle size reduction to ~6 um occurs, the ethanol is evaporated, and graphite powder such as Mage3 graphite powder having an average particle size (D50) of 23 μm (Hitachi Chemical Co. Ltd., Tokyo, Japan) is added. The $SiO_x$ particles and graphite powder are ball milled an additional 2 hours, thus producing a $SiO_x$ based powder, namely, SiOx/graphite powder intended for prelithiation in accordance with an embodiment of the present disclosure. Next, SLMP® powder (FMC Corporation) is added to the ball mill container, and ball milling for an additional 30 minutes leads to the partial prelithiation of the original SiOx/graphite powder, and the production of a partially prelithiated SSLC material. The partially prelithiated SiOx/graphite powder is next compressed into pellets in a conventional manner, with hexane elimination by filtration or evaporation. The pellets are then immersed in an electrolyte or a mixture of electrolytes in a vessel or container in order to complete the reaction of unreacted lithium with $SiO_x$ powder, to thereby produce the enhanced, substantially completely, or completely prelithiated SSLC material having a uniform, essentially uniform, or substantially uniform distribution of lithium silicides therein.

Delithiation occurs in the delithiation reactor 200 in the manner set forth above to produce the completely delithiated SSLC material powder. The ethanol/powder slurry is dried initially using a centrifuge, followed by ambient air flow. Dried delithiated SSLC material powder is mixed with carbon black and a binder in NMP solvent, and cast on Cu foil, with subsequent drying in a vacuum oven at 250° C., for use as a negative electrode for a Li ion battery.

Figure 4:
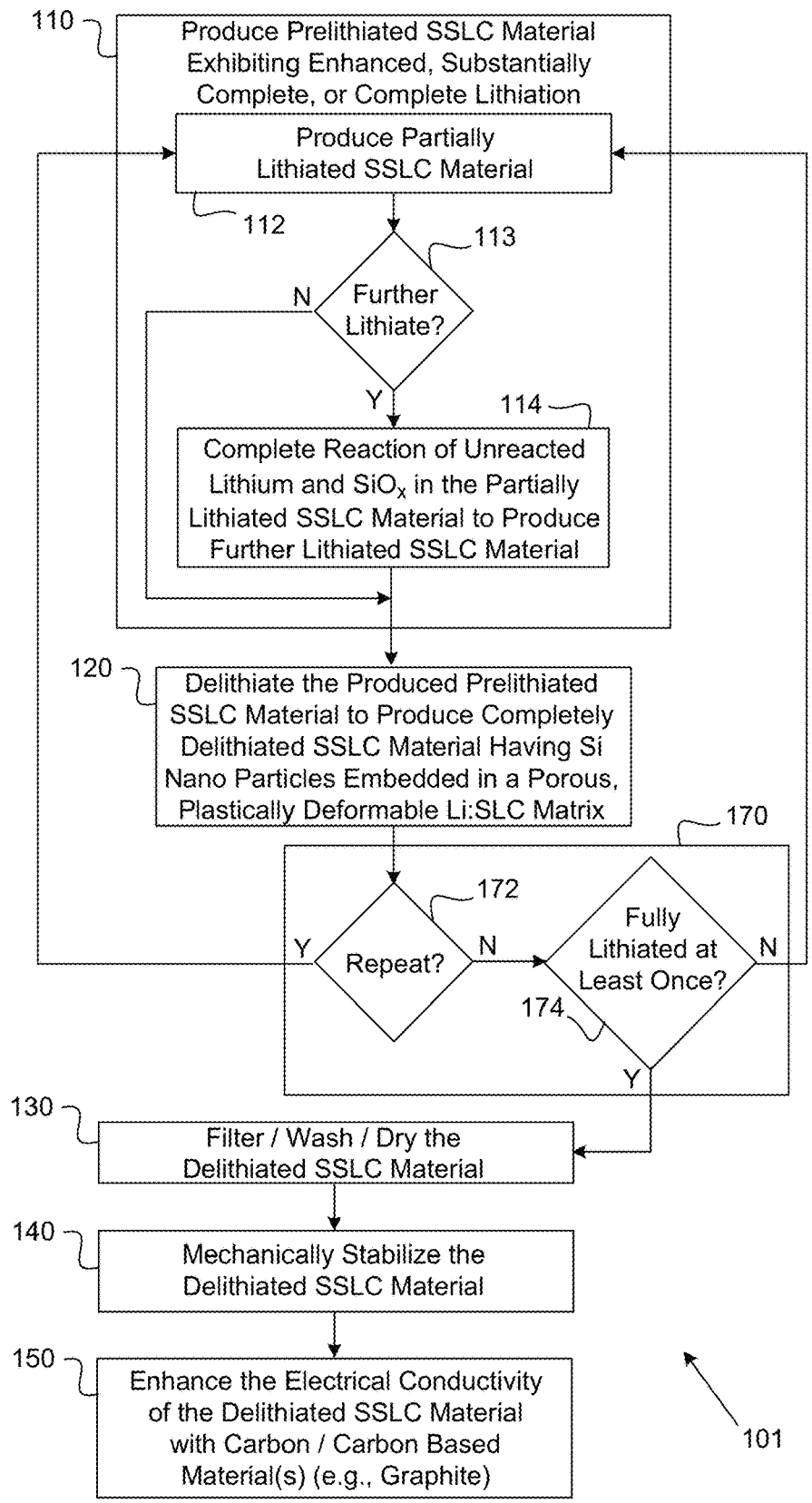
FIG. 4 is a flow diagram of a representative process for producing or manufacturing an SSLC material, material structure, or composition by way of a cyclical ex situ prelithiation—delithiation sequence in accordance with an embodiment of the present disclosure.

Aspects of a Representative Cyclical ex situ Prelithiation—Delithiation Sequence FIG. 4 is a flow diagram of a representative process 101 for producing or manufacturing a volume change compensated or volume change stabilized SSLC material, material structure, or composition by way of a cyclical ex situ prelithiation—delithiation sequence in accordance with an embodiment of the present disclosure. Like reference numbers in FIG. 4 relative to FIG. 1 indicate like, analogous, or similar process portions/procedures, involving like, analogous, or similar materials, in a manner readily understood by individuals having ordinary skill in the relevant art, where particular differences between process portions/procedures and/or materials corresponding to FIG. 4 relative to FIG. 1 are set forth below.

In various representative embodiments, a cyclical ex situ SSLC material production process 101 includes a first process portion 110 by which prelithiated SSLC material is produced; a second process portion 120 by which this prelithiated SSLC material is delithiated; a cyclical control portion 170 by which cyclical iterations of SSLC material prelithiation and delithiation (by way of the first process portion 110 and the second process portion 120) are selectively or selectably and controllably repeated; a third process portion 130 by which the delithiated SSLC material is filtered, washed, and dried; possibly a fourth process portion 140 by which the delithiated SSLC material is coated with one or more materials for purpose of enhancing mechanical or structural integrity or stability; and typically a fifth process portion 150 by which the delithated SSLC material or the mechanically stabilized SSLC material is coated or combined with one or more electrically conductive materials, such as one or more carbon or a carbon based materials, to enhance electrical conductivity.

The first process portion 110 produces a prelithiated SSLC material by way of a first or initial prelithiation procedure 112, which is possibly, selectively, or typically followed by a second or subsequent prelithiation procedure 114. The first prelithiation procedure 112 produces a partially prelithiated SSLC material. An intermediary procedure 113 determines whether to further or fully/completely prelithiate the partially prelithiated SSCL material that was produced in the first prelithiation procedure 112. The intermediary procedure 113 can be automated, semi-automated, or manual, depending upon embodiment details. In an automated or semi-automated embodiment, the intermediary procedure 113 can be defined or controlled, for instance, by way of program instructions stored in a computer readable medium such as a memory, and executed by a computer or controller having a processing unit (e.g., a microprocessor or microcontroller, or an equivalent thereof or analogue thereto), in a manner readily understood by individuals having ordinary skill in the art. In the event that the SSLC material produced in the first prelithiation procedure 112 is to be further/completely prelithiated, the second prelithiation procedure 114 produces an SSLC material that exhibits a greater, significantly enhanced, substantially complete, or complete extent of prelithiation compared to the prior art. Otherwise, the second prelithiation procedure 114 can be skipped, as long as it has been performed at least one time as part of the cyclical ex situ prelithiation—delithiation sequence, as further detailed below.

In the first prelithiation procedure 112, $SiO_x$, conductivity-enhanced $SiO_x$ in powder form, and/or a previously produced delithiated SSLC material can be mixed, combined, and/or reacted with metallic lithium, such as stabilized lithium powder (e.g., SLMP® from FMC Corporation, Charlotte, N.C. USA, www.fmclithium.com), to produce partially prelithiated SSLC material in powder form. The first prelithiation procedure 112 can be similar, generally analogous, analogous, substantially identical, essentially identical, or identical to that described above. Conductivity-enhanced $SiO_x$, conductivity enhanced SSLC material, and/or further conductivity enhanced SSLC material can be produced for use in or as part of the first prelithiation procedure 112 by way of treating, coating, or combining $SiO_x$ powder and/or the SSLC material with one or more electrically conductive materials such as carbon or carbon based materials, for instance, graphite, carbon black, graphene, buckyballs, carbon nanotubes, carbon megatubes, carbon nanorings, and/or carbon nanobuds in a conventional manner, as will be readily understood by individuals having ordinary skill in the relevant art. In some embodiments, conductivity-enhanced $SiO_x$ and/or conductivity-enhanced or further conductivity-enhanced SSLC material is produced by ball milling $SiO_x$ and/or SSLC material with one or more carbon or carbon based materials, which can result in carbon or carbon based particles entering or becoming part of agglomerated $SiO_x$ particles and/or SSLC materials produced during ball milling. Such ball milling can occur by way of a procedure that is similar, generally analogous, analogous, substantially identical, essentially identical, or identical to the ball milling indicated above. Additionally or alternatively, conductivity-enhanced $SiO_x$ and/or conductivity-enhanced SSLC material or further conductivity-enhanced SSLC material can be produced for use in the first prelithiation procedure 112 by way of another technique, such as thermal CVD by which carbon or a carbon based material is deposited on $SiO_x$ powder and/or SSLC material powder prior to reaction with lithium powder.

Reacting $SiO_x$, conductivity-enhanced $SiO_x$ powder, SSLC material, conductivity-enhanced SSLC material, and/or further conductivity-enhanced SSLC material with stabilized lithium powder can be carried out using a temperature controlled mixing/reaction device that applies a high shear stress in an inert gas atmosphere (e.g., an argon atmosphere, or an atmosphere containing helium), and which provides effective dissipation of heat generated during the reaction. Such a reaction device can be a ball mill as indicated above, having a thermally regulated or thermally conductive reaction container, vessel, or jar in which one or more materials in powder form (e.g., $SiO_x$ and/or SSLC based material) are mixed with stabilized lithium powder. Mixing/reaction device related parameters that can influence or determine the characteristics of the partially lithiated SSLC material include the heat release, heat transfer, and shear stress during the reaction, and the characteristics of the partially lithiated SSLC material can vary with charge, rotational speed, and/or milling time, in a manner readily understood by individuals having ordinary skill in the art.

When electrical conductivity-enhanced $SiO_x$ and/or electrical conductivity-enhanced SSLC material is used in the first process portion 110, the electrical conductivity enhancement can result in such materials having a significantly improved thermal conductivity, which can aid heat dissipation and thermal regulation during ball milling, in a manner essentially identical or analogous to that described above.

In the second prelithiation procedure 114, the partially prelithiated SSLC material is compressed (e.g., compressed into pellets or pelletized in a conventional manner, such as by way of conventional pelletizing equipment (i.e., a pelletizer) or press, or direct compression tableting equipment) and immersed in a lithium based electrolyte solution (e.g., a lithium salt based electrolyte solution, or an equivalent thereto) in order to complete the reaction of unreacted lithium and $SiO_x$ in the partially lithiated SSLC material, until all unreacted lithium disappears and an enhanced uniformity or uniform composition of lithium silicides is achieved in the SSLC material by lithium diffusion. The partially prelithiated SSLC material can alternatively be immersed in another type of chemical solution, for instance, an ester, a carbonate, or a solvent used in Li ion battery electrolyte solvent, in a manner understood by individuals having ordinary skill in the relevant art.

After the second prelithiation procedure 114, the resulting SSLC material exhibits much more uniform or uniform prelithiation, for instance, over a shorter or greatly or significantly reduced time period (e.g., as compared to ball milling alone), as well as an extent of prelithiation that is greater, significantly greater, or much greater than the extent of prelithiation achieved by the teachings of U.S. Pat. No. 7,776,473. In multiple embodiments, the complete first process portion 110 (i.e., the first prelithiation procedure 112 in combination with the second prelithiation procedure 114) results in a substantially complete, essentially complete, or complete prelithiation of the SSLC material, which includes lithium silicide uniformly or generally uniformly distributed therein.

The second prelithiation procedure 114 further and possibly completely prelithiates the SSLC material in a uniform or highly uniform manner, which enables the SSLC to achieve maximum volumetric plastic deformation of the SSLC material such that most of the free Si nanoparticles in the SSLC form lithium silicide. If the second prelithiation procedure 114 is not carried out at least one time during the cyclical ex situ prelithiation—delithiation sequence, there is a chance that the SSLC material may expand further or greatly when the delithiathed SSLC material is charged during actual use as anode active material, which will cause unwanted volumetric expansion. Additionally, if the SSLC material is more fully or completely liathiated by way of the second prelithiation procedure 114, the energy density and capacity of the SSLC material can be enhanced or maximized/optimized such that the Si nano particles in the amorphous delithiated SSLC material have greater capacity to receive lithium ions without excessive increase in the SSLC material's volume. In various embodiments, after the first process portion 110 (i.e., upon completion of the first and second prelithiation procedures 112, 114, the extent of prelithiation of the SSLC material can range from approximately 25%-75%, or approximately 25%-100%.

The SSLC material production process 101 further includes a second process portion 120 that involves delithiating the prelithiated SSLC material in a delithiation reactor 200 to thereby produce a delithiated SSLC material in which amorphous and/or crystallite silicon nanoparticles are embedded in an Si:LSC matrix, and any unreacted lithium and active lithium silicide do not remain. In various embodiments, the second process portion 120 involves dispersing the lithiated SSLC material in an organic solvent or an organic solvent mixture, and controllably reacting this dispersed lithiated SSLC material with at least one delithiating agent (e.g., an acid and/or an alcohol, as indicated above) that reacts with lithium silicide such that the prelithiated SSLC material loses lithium, thereby becoming essentially completely, completely, or fully delithiated SSLC material. For instance, after the second process portion 120, the delithiated SSLC material can have a lithium silicide content of less than approximately 0.5% by weight. In various embodiments, the second process portion 120 involves delithiating the prelithiated SSLC material under an inert atmosphere (e.g., argon gas), while stirring the dispersed SSLC material as the delithiating agent(s) are added.

Following the second process portion 120 (i.e., after the first and second prelithiation procedures 112, 114 have been performed, and the SSLC material has been delithiated), the cyclical control portion 170 determines whether to repeat the prelithiation and delithiation of the SSLC material that was most-recently or previously produced, i.e., to perform another SSLC material prelithiation—delithiation iteration (by way of the first and second process portions 110, 120), possibly in association or combination with further addition of $SiO_x$ powder thereto. More particularly, a first control procedure 172 can determine whether the first process portion 110 is to be repeated. If so, the process 101 returns to the first process portion 110 (e.g., to the first prelithiation procedure 112). Otherwise, a second control procedure 174 determines whether a completely/fully or essentially completely/fully lithiated SSLC material has been produced at least once, e.g., the second control procedure 174 determines whether the second prelithiation procedure 114 has been performed at least one time after the first prelithiation procedure 112. If not, the process 101 returns to the first process portion 110 (e.g., to the first prelithiation procedure 112) such that the second prelithiation procedure 114 can occur; otherwise, the process 101 can continue to the third process portion 130. Aspects of the cyclical control portion 170 can be automated, semi-automated, or manual, depending upon embodiment details. Automated aspects of the cyclical control portion 170 can be defined or established by way of program instruction sets stored in a computer readable medium such as a memory, and executable/executed by a computer or controller having a processing unit (e.g., a microprocessor or microcontroller, or an equivalent thereto or an analogue thereof), in a manner readily understood by individuals having ordinary skill in the relevant art.

Depending upon embodiment details, the production of a volume change compensated or volume change stabilized SSLC material by way of cyclical prelithiation—delithiation or SSLC material in accordance with a cyclical ex situ SSLC material production process 101 can involve the formation of completely or essentially completely prelithiated SSLC material as a result of a first cycle iteration or each cycle iteration, or the production of only partially prelithiated SSLC material as a result of one or more cycle iterations, as long as at least one cycle iteration of the overall process 101 produces completely or essentially completely lithiated SSLC material. Moreover, in some embodiments, cyclical prelithiation—delithiation of SSLC material in accordance with a cyclical ex situ SSLC material production process 101 can produce (e.g., sequentially or successively) SSLC material(s) having progressively increasing prelithiation from one cyclical iteration to the next. In general, embodiments of a cyclical ex situ SSLC material production process 101 in accordance with the present disclosure can produce SSLC material(s) having identical or differing extents of prelithiation from one cyclical iteration to the next. For instance, successively produced prelithiated SSLC materials can exhibit successively greater prelithiation from one iteration to a subsequent or successive iteration of the the cyclical ex situ prelithiation—delithiation process.

Repeated or cyclical ex situ prelithiation—delithiation of SSLC material in accordance with embodiments of the present disclosure can result in overall volumetric reduction or volumetric contraction of porous or void containing portions of the SSLC material subjected to such prelithiation—delithiation (e.g., in a progressive manner for each iteration), such that when the volume change compensated or volume change stabilized SSLC material is incorporated into an as-fabricated anode, the as-fabricated anode can exhibit reduced or minimal/minimized volume changes during early or initial battery cell charge—discharge cycles, compared to an anode fabricated using a non-volume change compensated or non-volume change stabilized SSLC material or other material(s) that had not been subjected to multiple iterations of ex situ prelithiation—delithiation.

Consequently, an anode fabricated with a volume change compensated or volume change stabilized SSLC material in accordance with an embodiment of the present disclosure, which has been subjected to multiple iterations of ex situ prelithiation—delithiation prior to anode fabrication, can exhibit reduced or minimum size or volume relative to an intended or target capacity, or an enhanced capacity relative to an intended or target as-fabricated anode size. Correspondingly, a battery cell or battery having an as-fabricated anode therein that is made with a volume change compensated or volume change stabilized SSLC material, which has been subjected to multiple iterations of ex situ prelithiation—delithiation in accordance with an embodiment of the present disclosure, can exhibit reduced or minimum packaging size or volume relative to an intended or target capacity, or enhanced capacity relative to an intended or target battery packaging or container size or volume.

In a representative embodiment, a volume change compensated or volume change stabilized SSLC material production process 101 can include 3-12 (e.g., 3-10, or 4-8) prelithiation—delithiation iterations.

Compared to a non-volume change compensated or non-volume change stabilized SSLC material produced in accordance with an embodiment of the present disclosure, a volume change compensated or volume change stabilized SSLC material produced in accordance with an embodiment of the present disclosure can exhibit a volume change reduction between 5-50% or more, e.g., between 15%-45%, or 20%-40%, or 25%-35%. In some embodiments, when used in situ as negative electrode active material in a lithium ion battery cell, a volume change compensated or volume change stabilized SSLC material produced in accordance with an embodiment of the present disclosure can exhibit a volume change of less or equal to than approximately 3.5-30% (e.g., averaging less than or equal to approximately 10-25%, or less than or equal to approximately 7.5-20%) between lithiation (charging) and delithiation (discharging).

The third process portion 130 involves filtering, washing, and possibly drying the delithiated SSLC material in a conventional manner, for instance, drying in air and possibly drying under negative pressure or vacuum, where such drying can occur at a temperature between 100-120° C. (e.g., in an oven)). In the fourth process portion 140, the delithiated SSLC material can be mechanically stabilized or structurally reinforced by way of coating with one or more types of materials, such as one or more of $LiAlO_3$, $Al_2O_3$, $TiO_2$, $AlF_3$, and LiF in a conventional manner. Finally, in the fifth process portion 150, the delithiated SSLC material or the mechanically stabilized delithiated SSLC material is treated, coated, or combined with one or more carbon and/or carbon based materials such as graphite, carbon black, graphene, buckyballs, carbon nanotubes, carbon megatubes, carbon nanorings, and/or carbon nanobuds in a conventional manner. In several embodiments, the fifth process portion 150 involves coating the delithiated SSLC material or the mechanically stabilized delithiated SSLC material with a carbon based material (e.g., graphite) by way of CVD, which partially fuses the carbon based material with the delithiated SSLC material. Individuals having ordinary skill in the art will recognize that depending upon embodiment details, the fifth process portion 150 can be performed before and/or after the fourth process portion 140.

Following the fifth process portion 150, the delithiated SSLC material can be used as a non-aqueous electrolyte secondary cell negative electrode (anode) material, for instance, in association with an anode fabrication or manufacturing process.

In view of the foregoing, in several embodiments, an ex situ cyclical prelithiation—delithiation process in accordance with several embodiments of the present disclosure involves: providing or producing an initially prelithiated SSLC material from $SiO_x$ source material, for instance, by way of reacting the $SiO_x$ source material with stabilized metallic lithium powder; followed by delithiating this initially prelithiated SSLC material; followed by re-prelithiating this most-recently delithiated SSLC material (i.e., re-introducing lithium into this most-recently delithiated SSLC material, or at least partially prelithiating this most-recently delithiated SSLC material again), possibly in the presence of or in combination with prelithiating additional $SiO_x$ source material and/or re-prelithiating other previously delithiated SSLC material; followed by delithiating this most-recently produced re-prelithiated SSLC material and any newly prelithiated SSLC material; possibly further followed by one or more of the foregoing prelithiation—delithiation iterations. During the ex situ cyclical prelithiation—delithiation process, the process fully, completely, or essentially completely (a) prelithiates all SSLC material(s) under consideration at least one time; and (b) delithiates all SSLC materials under consideration during a final delithiation portion of the process, to produce a final volume stabilized or volume compensated SSLC material that can possibly be further conductivity enhanced; possibly physically or structurally mechanically reinforced or stabilized; and subsequently used to form portions of an anode during an anode manufacturing process.

Figure 5A:
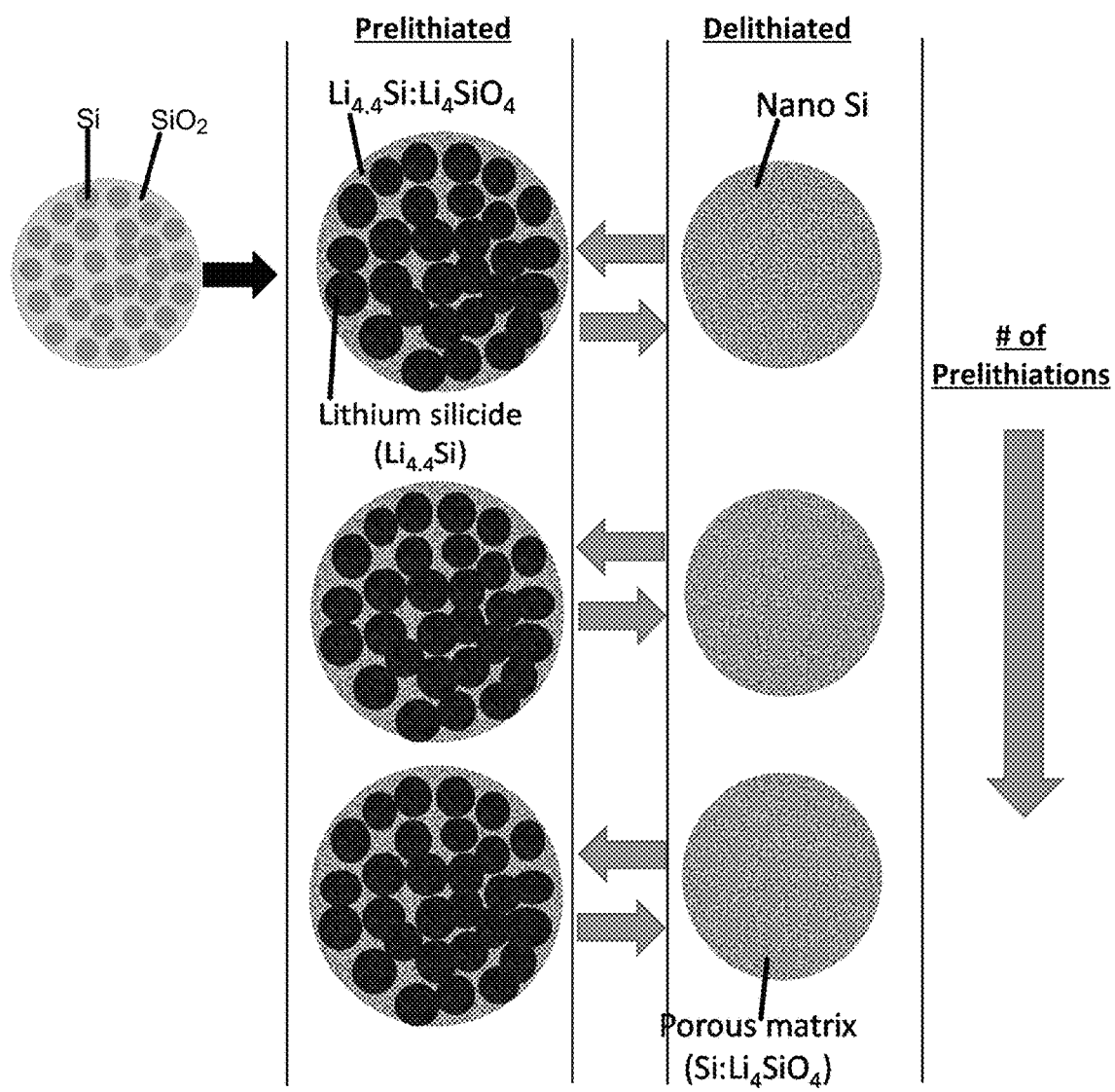
FIGS. 5A-5B are illustrations of representative possible or expected mechanisms by which volumetric change or expansion is reduced, compensated, or stabilized during the production or manufacture of a volume change compensated or volume change stabilized SSLC material, material structure, or composition in accordance with an embodiment of the present disclosure.
Figure 5B:
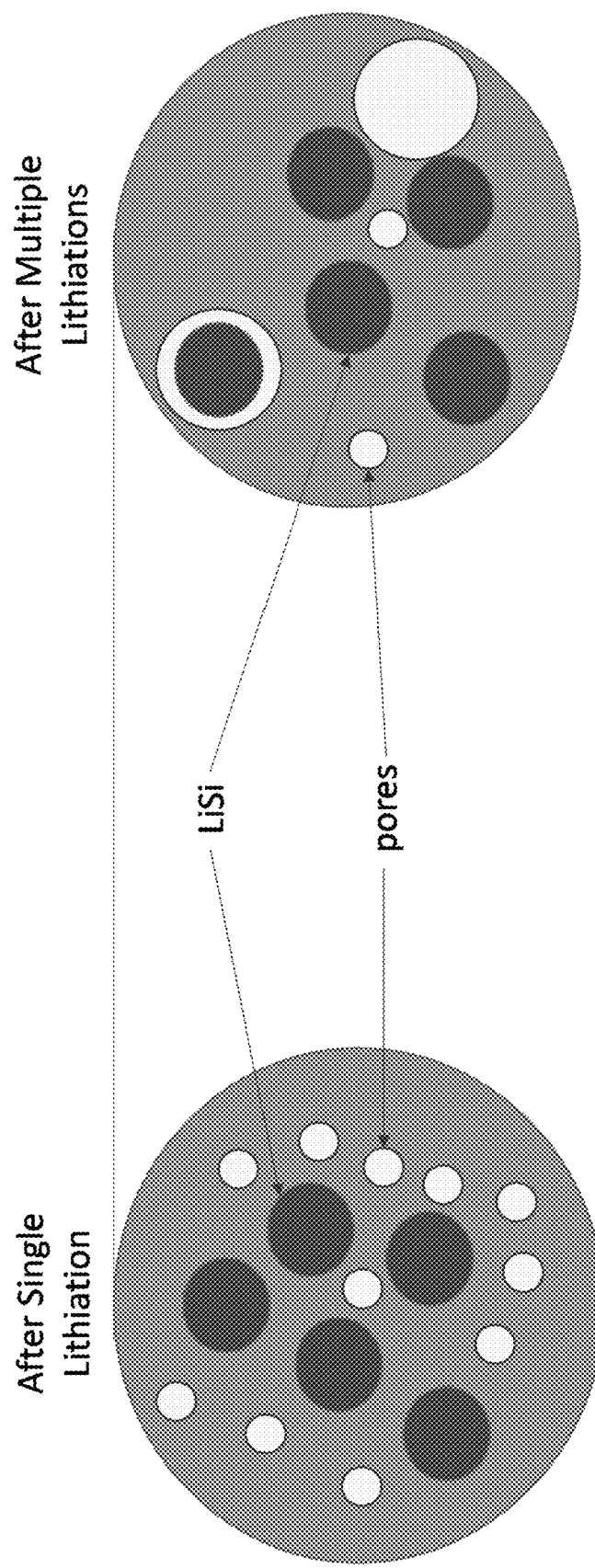

FIGS. 5A-5B are illustrations of representative possible or expected mechanisms by which volumetric change or expansion is reduced, compensated, or stabilized during the production or manufacture of a volume change compensated or volume change stabilized SSLC material in accordance with an embodiment of the present disclosure. Possible or expected mechanisms indicated in FIGS. 5A-5B and described in the associated text herein are provided for purpose of illustration and to aid understanding, and shall not be construed as limiting or binding with regard to aspects of the present disclosure.

As indicated in FIG. 5A, by way or as a result of multiple prelithiation—delithiation iterations, the porosity of the porous lithium silicate matrix increases, and the average size ratio or average size difference between prelithiated and delithiated particles in the porous matrix decreases. Moreover, the distribution of porosity in the porous matrix can change, for instance, in a representative manner indicated in FIG. 5B under the same or essentially the same overall porosity conditions for purpose of illustration. Small(er) pores can nucleate, and in order to reduce surface area some smaller pores can be consumed or aggregated to generate larger pores. Because lithium silicide is "soft" and under compression when lithiated, material stress is relieved because a greater percentage or number of larger pores in the porous matrix can be occupied with LiSi particles compared to smaller pores (e.g., preferentially LiSi would spontaneously move inside larger pores thereby relieving pressure on the porous matrix).

Further in view of the foregoing description, by way of an ex situ SSLC material fabrication process in accordance with an embodiment of the present disclosure (e.g., the process 101 of FIG. 4), an extent, magnitude, or measure of SSLC material volumetric plastic deformation can progressively decrease across multiple prelithiantion—delithiation process portion iterations, from a maximum extent of SSLC material volumetric plastic deformation to a smaller/reduced or smallest/minimum achievable extent of SSLC material volumetric plastic deformation.

Thus, compared to an anode structure or anode that incorporates a conventional SSLC material or an SSLC material produced ex situ (i.e., prior to its incorporation or use in the anode structure or anode) by way of a single complete prelithiation process portion and a single complete delithiation process portion (e.g., in accordance with the process 100 of FIG. 1), an anode structure or anode that incorporates an SSLC material produced ex situ (i.e., prior to its incorporation or use in the anode structure or anode) by way of cyclical prelithiation—delithiation involving multiple prelithiantion—delithiation process portion iterations (e.g., in accordance with the process 101 of FIG. 4) can exhibit a more stable, smaller, less variable, or less dramatic extent of volumetric deformation (e.g., volumetric expansion and contraction) that arises as a result of lithiation and delithiation associated with anode or battery charge and discharge cycles.

Aspects of particular embodiments of the present disclosure address at least one aspect, problem, limitation, and/or disadvantage associated with existing $SiO_x$ based anode materials, compositions, or structures; processes for the preparation of $SiO_x$ anode materials, compositions, or structures; and $SiO_x$ based anodes. While features, aspects, and/or advantages associated with certain embodiments have been described in the present disclosure, other embodiments may also exhibit such features, aspects, and/or advantages, and not all embodiments need necessarily exhibit such features, aspects, and/or advantages to fall within the scope of the present disclosure and the claims set forth below. It will be appreciated by a person of ordinary skill in the art that several of the above-disclosed systems, components, processes, or alternatives thereof, may be desirably combined into other different systems, components, processes, and/or applications. In addition, a person of ordinary skill in the relevant art can make various modifications, alterations, and/or improvements to various embodiments disclosed herein, which remain within the scope of the present disclosure and the claims set forth below.

The invention claimed is:

1. A method for producing a volume change compensated silicon-silicon oxide-lithium composite (SSLC) material, the method comprising:
   producing an initially prelithiated SSLC material;
   delithiating the initially prelithiated material to produce a delithiated SSLC material; and
   performing at least one iteration of a volume change compensation process comprising:
   (a) re-prelithiating the delithiated SSLC material to produce a re-prelithiated SSLC material, and
   (b) delithiating the re-prelithiated SSLC material produced in (a),
      wherein at least one of the following is satisfied:
      (i) prior to performing the at least one iteration of the volume change compensation process the initially prelithiated SSLC material is completely lithiated, and
      (ii) the at least one iteration of the volume change compensation process produces a re-prelithiated SSLC material that is completely prelithiated,
   wherein in a final iteration of the volume change compensation process, delithiating the re-prelithiated SSLC material produced in (a) comprises completely delithiating the re-prelithiated SSLC material to produce the volume change compensated SSLC material, and
   wherein the volume change compensated SSLC material is produced ex situ with respect to fabrication of an anode that contains the produced volume change compensated SSLC material.

2. The method of claim 1, wherein the volume change compensated SSLC material comprises a porous plastically deformable Si:Lithium Silicate Composite (Si:LSC) matrix having nano silicon particles embedded therein.

3. The method of claim 1, wherein the initially prelithiated SSLC material and the re-prelithiated material produced during each iteration of the volume change compensation process are produced in slurry form.

4. The method of claim 1, wherein the volume change compensation process is repeated 3-12 times.

5. The method of claim 1, wherein in each iteration of the volume change compensation process, the re-prelithiated SSLC material is completely prelithiated.

6. The method of claim 1, wherein in a selected iteration of the volume change compensation process, the re-prelithiated SSLC material has a higher lithium content than in another iteration of the volume change compensation process.

7. The method of claim 1, wherein each delithiating of the re-prelithiated SSLC material completely delithiates the re-prelithiated SSLC material.

8. The method of claim 1, wherein delithiating the initially prelithiated SSLC material and delithiating the re-prelithiated SSLC material comprises exposing the initially prelithiated SSLC material and exposing the re-prelithiated SSLC material, respectively, to a delithiating agent comprising at least one of a carboxylic acid, a sulfonic acid, and an alcohol.

9. The method of claim 8, wherein the delithiating agent comprises at least one of: formic acid (methanoic acid), HCOOH ($pK_a$=3.8); acetic acid (ethanoic acid), $CH_3COOH$ ($pK_a$=4.7); propionic acid (propanoic acid), $CH_3CH_2COOH$ ($pK_a$=4.9); butyric acid (butanoic acid), $CH_3CH_2CH_2COOH$ ($pK_a$=4.8); valeric acid (pentanoic acid), $CH_3CH_2CH_2CH_2COOH$ ($pK_a$=4.8); caprioc acide (hexanoic acide), $CH_3CH_2CH_2CH_2CH_2COOH$ ($pK_a$=4.9); oxalic acid (ethanedioic acid), (COOH)(COOH)($pK_a$=1.2); lactic acid (2-hydroxypropanoic acid), $CH_3CHOHCOOH$ ($pK_a$=3.9); malic acid (2-hydroxybutanedioic acid), $(COOH)CH_2CHOH(COOH)$ ($pK_a$=3.4); citric acid (2-hydroxypropane- 1,2,3 -tricarboxylic acid), $CH_2(COOH)COH(COOH)CH_2(COOH)$ ($pK_a$=3.1); benzoic acid (Benzenecarboxylic acid [IUPAC ] or phenylmethanoic acid, non-IUPAC), $C_6H_5COOH$ ($pK_a$=4.2); carbonic acid (hydroxymethanoic acid, non-IUPAC name), OHCOOH or $H_2CO_3$ ($pK_a$=3.6); phenol (carbolic acid or hydroxybenzene, non-IUPAC names), $C_6H_5OH$ ($pK_a$=9.9); uric acid (7,9-Dihydro-1H -purine-2,6,8(3H)-trione), $C_5H_4N_4O_3$ ($pK_a$=−1.1); taurine (2-aminoethanesulfonic acid), $C_2H_7NO_3S$ ($pK_a$=9.0); p-toluenesulfonic acid (4-methylbenzenesulfonic acid), $CH_3C_6H_4SO_3H$ ($pK_a$=−2.8); and trifluoromethanesulfonic acid, $CF_3SO_3H$ ($pk_a$=−12).

10. The method of claim 8, wherein the delithiating agent comprises at least one of:
   (a) a monohydric alcohol selected from among: methanol, $CH_3OH$; ethanol, $C_2H_5OH$; propan-2-ol, $C_3H_7OH$; butan-1-ol, $C_4H_9OH$; pentan-1-ol, $C_5H_{11}OH$; and hexadecan-1-ol, $C_{16}H_{33}OH$;
   (b) a polyhydric alcohol selected from among: ethane-1,2-diol, $C_2H_4(OH)_2$; propane-1,2-diol, $C_3H_6(OH)_2$; propane-1,2,3-triol, $C_3H_5(OH)_3$; butane-1,2,3,4-tetraol, $C_4H_6(OH)_4$; pentane-1,2,3,4,5-penotol, $C_5H_7(OH)_5$; hexane-1,2,3,4,5,6-hexol, $C_6H_8(OH)_6$; and heptane-1,2,3,4,5,6,7-heptol, $C_7H_9(OH)_7$;
   (c) an unsaturated aliphatic alcohol selected from among prop-2-ene-1-ol, $C_3H_5OH$; 3,7-dimethylocta-2,6-dien-1-ol, $C_{10}H_{17}OH$; and prop-2-yn-1-ol, $C_3H_3OH$;
   (d) an alicyclic alcohol selected from among: cyclohexane-1,2,3,4,5,6-hexol, $C_6H_6(OH)_6$; and 2-(2-propyl)-5-methyl-cyclohexane-1-ol, $C_{10}H_{19}OH$; and
   (e) polyvinyl alcohol (PVA) $[CH_2CH(OH)]_n$.

11. A method for fabricating an anode for a lithium ion battery, comprising:
   producing a volume change compensated silicon:silicon oxide:lithium composite (SSLC) material by:
   producing an initially prelithiated SSLC material;
   delithiating the initially prelithiated material to produce a delithiated SSLC material; and
   performing at least one iteration of a volume change compensation process comprising:
   (a) re-lithiating the delithiated SSLC material to produce a re-prelithiated SSLC material, and
   (b) delithiating the re-prelithiated SSLC material produced in (a);
      wherein at least one of the following is satisfied:
      (i) prior to performing the at least one iteration of the volume change compensation process the initially prelithiated SSLC material is completely lithiated, and
      (ii) at least one iteration of the volume change compensation process produces a re-prelithiated SSLC material that is completely prelithiated,
   wherein in a final iteration of the volume change compensation process, delithiating the re-prelithiated SSLC material produced in (a) comprises completely delithiating the re-prelithiated SSLC material to produce the volume change compensated SSLC material, and after producing the volume change compensated SSLC material, fabricating an anode structure containing the produced volume change compensated SSLC material.

* * * * *